US011782929B2

(12) United States Patent
Santos et al.

(10) Patent No.: US 11,782,929 B2
(45) Date of Patent: *Oct. 10, 2023

(54) AUGMENTED EXPLORATION FOR BIG DATA AND BEYOND

(71) Applicants: Eugene S. Santos, West Lebanon, NH (US); Eunice E. Santos, Champaign, IL (US); Evelyn W. Santos, West Lebanon, NH (US); Eugene Santos, Jr., West Lebanon, NH (US)

(72) Inventors: Eugene S. Santos, West Lebanon, NH (US); Eunice E. Santos, Champaign, IL (US); Evelyn W. Santos, West Lebanon, NH (US); Eugene Santos, Jr., West Lebanon, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/561,022

(22) Filed: Dec. 23, 2021

(65) Prior Publication Data

US 2022/0114182 A1    Apr. 14, 2022

Related U.S. Application Data

(63) Continuation of application No. 16/596,112, filed on Oct. 8, 2019, now Pat. No. 11,216,467, which is a
(Continued)

(51) Int. Cl.
  *G06F 16/2455*   (2019.01)
  *G06F 16/27*     (2019.01)
  (Continued)

(52) U.S. Cl.
  CPC .. *G06F 16/24568* (2019.01); *G06F 16/24573* (2019.01); *G06F 16/254* (2019.01);
  (Continued)

(58) Field of Classification Search
  CPC ......... G06F 16/24568; G06F 16/24573; G06F 16/254; G06F 16/27; G06F 16/28;
  (Continued)

(56) References Cited

U.S. PATENT DOCUMENTS 5,179,634 A    1/1993   Matsunaga et al.
5,355,445 A    10/1994  Shibao et al.
(Continued)

FOREIGN PATENT DOCUMENTS

WO    WO 00/42487 A9    9/2001
WO       0681720 B1    11/2001
(Continued)

OTHER PUBLICATIONS

"*Fuzzy Sets*"; L.A. Zadeh; Department of Electrical Engineering and Electronics Research Laboratory, University of California, Berkeley, California; 1965; pp. 338-353.
(Continued)

*Primary Examiner* — Michael Pham
(74) *Attorney, Agent, or Firm* — STAAS & HALSEY LLP

(57) ABSTRACT

A computer is to obtain specification concept graphs of nodes $\text{spec}_1, \text{spec}_2, \ldots, \text{spec}_m$ including concept nodes and relation nodes according to at least one of a plurality of digitized data from a plurality of computerized data sources forming a first set of evidences U and obtain concept graphs of nodes $c\alpha_1, c\alpha_2, \ldots, c\alpha_n$ including concept nodes and relation nodes for corresponding obtained plurality of information and knowledge (IKs) $\alpha_1, \alpha_2, \ldots, \alpha_n$ forming a second set of evidences U. A subset of concept graphs of nodes is selected from $c\alpha_1, c\alpha_2, \ldots, c\alpha_n$ according to a computable measure of consistency, inconsistency and/or priority threshold between $c\alpha_j$ in $c\alpha_1, c\alpha_2, \ldots, c\alpha_n$ to specification concept graph $\text{spec}_k$ in $\text{spec}_1, \text{spec}_2, \ldots, \text{spec}_m$.
(Continued)

Knowledge fragments are generated for corresponding subset of concept graphs $c\alpha_{i_1}, c\alpha_{i_2}, \ldots, c\alpha_{i_h}$ to include augmenting information objects by creating or adding into at least one knowledge-base (KB), new objects in form $\omega=E\rightarrow A$ from the concept fragments, including a computed validity (v) and a plausibility (p) for a combination of relationship constraints $\mathcal{C}_\kappa$ for the concept fragments and obtained propositions $\mathcal{A}_\kappa$ for the fragment concepts.

19 Claims, 8 Drawing Sheets

Related U.S. Application Data continuation of application No. 15/584,874, filed on May 2, 2017, now Pat. No. 10,482,088.

(60) Provisional application No. 62/331,642, filed on May 4, 2016.

(51) Int. Cl.
| | |
|---|---|
| G06F 16/28 | (2019.01) |
| G06F 16/25 | (2019.01) |
| G06F 16/901 | (2019.01) |
| G06F 16/9038 | (2019.01) |
| G06F 16/2457 | (2019.01) |

(52) U.S. Cl.
CPC .............. *G06F 16/27* (2019.01); *G06F 16/28* (2019.01); *G06F 16/285* (2019.01); *G06F 16/9024* (2019.01); *G06F 16/9038* (2019.01); *G06F 16/9027* (2019.01)

(58) Field of Classification Search
CPC ............... G06F 16/285; G06F 16/9024; G06F 16/9038; G06F 16/9027
USPC ........................................................ 707/750
See application file for complete search history.

(56) References Cited

U.S. PATENT DOCUMENTS

| | | | |
|---|---|---|---|
| 5,402,526 | A | 3/1995 | Bauman et al. |
| 5,630,025 | A | 5/1997 | Dolby |
| 5,768,578 | A | 6/1998 | Kirk et al. |
| 6,385,600 | B1 | 5/2002 | McGuinness |
| 7,421,419 | B2 | 9/2008 | Maren |
| 8,170,906 | B2 | 5/2012 | Von Schweber |
| 2004/0019575 | A1 | 1/2004 | Talbot et al. |
| 2004/0225653 | A1 | 11/2004 | Nelken et al. |
| 2005/0192870 | A1 | 9/2005 | Geddes |
| 2007/0005523 | A1 | 1/2007 | Maren |
| 2007/0009421 | A1 | 4/2007 | Craig et al. |
| 2007/0094216 | A1 | 4/2007 | Mathias |
| 2007/0156720 | A1 | 7/2007 | Maren |
| 2007/0203693 | A1 | 8/2007 | Estes |
| 2008/0021912 | A1 | 1/2008 | Seligman et al. |
| 2009/0024615 | A1 | 1/2009 | Pedro |
| 2009/0210081 | A1 | 8/2009 | Sustaeta |
| 2009/0271358 | A1 | 10/2009 | Lindahl et al. |
| 2010/0063947 | A1 | 3/2010 | Burnside et al. |
| 2010/0153368 | A1 | 6/2010 | Peoples et al. |
| 2012/0059776 | A1 | 3/2012 | Estes |
| 2013/0173249 | A1 | 7/2013 | Eggebraaten et al. |
| 2013/0246328 | A1 | 9/2013 | Sweeney |
| 2013/0304675 | A1 | 11/2013 | Santos et al. |
| 2014/0201126 | A1 | 7/2014 | Zadeh |
| 2014/0337306 | A1 | 11/2014 | Gramatica |
| 2015/0379414 | A1 | 12/2015 | Yeh |
| 2017/0161619 | A1 | 6/2017 | Franceschini |

FOREIGN PATENT DOCUMENTS

| | | |
|---|---|---|
| WO | WO 2006/110853 A2 | 10/2006 |
| WO | WO 2006/110853 A3 | 10/2006 |
| WO | WO 2014/200877 A1 | 12/2014 |

OTHER PUBLICATIONS

"*The Role of Fuzzy Logic in the Management of Uncertainty in Expert Systems*"; L.A. Zadeh; Computer Science Division, Department of EECS and ERL, University of California, Berkeley; Fuzzy Sets and Systems 11 (1983) pp. 199-227.
"*Toward a generalized theory of uncertainty (GTU) —an outline*"; Lotfi A. Zadeh; Berkeley initiative in Soft Computing (BISC), Computer Science Division and the Electronics Research Laboratory, Department of EECS, University of California, Berkeley, CA; Information Sciences 172 (2005) pp. 1-40.
"*Review of Books: A Mathematical Theory of Evidence*"; Lotfi A. Zadeh; AI Magazine vol. 5, No. 3 (1984); pp. 81-83.
"*A Simple View of the Dempster-Shafer Theory of Evidence and its Implication for the Rule of Combination*"; Lotfi A. Zadeh; Computer Science Division, University of California, Berkeley, California; AI Magazine vol. 7 No. 2 (1986); pp. 85-90.
"*A framework for building knowledge-bases under uncertainty*'", Eugene Santos Jr. and Eugene S. Santos; Journal of Experimental & Theoretical Artificial Intelligence 11 (1999) pp. 265-286.
"*Implicitly preserving semantics during incremental knowledge base acquisition under uncertainty*", Eugene Santos Jr., Eugene S. Santos, and Solomon Eyal Shimony; Dec. 1, 2001; International Journal of Approximate Reasoning 33 (2007) pp. 71-94.
"*Using Approximate Reasoning to Represent Default Knowledge*", Ronald R. Yager; Artificial Intelligence 31 (1987); pp. 99-112.
"*Probabilistic Logic*", Nils J. Nilsson; Computer Science Department, Stanford University, Stanford, CA; Artificial Intelligence 28 (1986); pp. 71-87.
"*Reasoning with Uncertainty in Deductive Databases and Logic Programs*", Raymond T. Ng; Department of Computer Science, University of British Columbia, Vancouver, B.C.; International Journal of Uncertainty, Fuzziness and Knowledge-Based Systems vol. 5, No. 3 (1997); pp. 261-316.
"*Imprecision and incompleteness in relational databases: survey*", A. Motro; Computer Science Department, University of Southern California, Los Angeles, CA; Information and Software Technology vol. 32, No. 9, Nov. 1990; pp. 579-588.
"*Constructing Probabilistic ATMS Using Extended Incidence Calculus*", Weiru Liu, Alan Bundy; Department of Artificial Intelligence, University of Edinburgh, Edinburgh, U.K.; International Journal of Approximate Reasoning 1994 11:1-158; pp. 1-37.
"*An Extended Relational Database Model For Uncertain And Imprecise Information*", Suk Kyoon Lee; Department of Computer Science, University of Iowa, Iowa City, IA; Proceedings of the 18$^{th}$ VLDB Conference Vancouver, British Columbia, Canada 1992; pp. 211-220.
"*Reasoning with Uncertainty in a Knowledge Based System*"; Eugene S. Santos, Eugene Santos Jr.; 0195-623X/87/0000/0075$01.00 1987 IEEE; pp. 75-81.
"*A Normal Form for Relational Databases that is Based on Domains and Keys*"; Ronald Fagin; IBM Research Library; ACM Transactions on Database Systems, vol. 6, No. 3, Sep. 1981, pp. 387-415.
"*An Assumption-based TMS*"; Johan de Kleer; Intelligent Systems Laboratory, XEROX Palo Alto Research Center; Artificial Intelligence 28 (1986); pp. 127-162.
"*Incidence Calculus: A Mechanism for Probabilistic Reasoning*"; Alan Bundy; Department of Artificial Intelligence, University of Edinburgh; Journal of Automated Reasoning 1 (1985) 0168-7433/85.15 pp. 263-283.
PCT/ISA/237 Written Opinion dated Nov. 7, 2013 in related International Patent Application No. PCT/US2013/040317; (42 pages).
Forms PCT/IPEA/416 and PCT/IPEA/409, International Preliminary Report on Patentability, dated Jun. 24, 2014 in related International Application No. PCT/US2013/040317 (62 pages).

(56) References Cited

OTHER PUBLICATIONS

Form PCT/ISA220 and Form PCT/ISA/210, International Search Report dated Nov. 26, 2013 in related International Application No. PCT/US2013/040317 (4 pages).
Minker. *An Overview of Nonmonotonic Reasoning and Logic Programming*. The Journal of Logic Programming, vol. 17. 1993. pp. 95-126. [retrieved on Nov. 7, 2013], Retrieved from the Internet:URL:http://www.sciencedirect.com/science/article/pii/074310669390028F/pdf?md5=0650470a65f0c545f5d7aac037fc2332&pid=1-s2.074310669390028F-main.pdf. entire document.
L.A. Zadeh. *"On The Validity of Dempster's Rule of Combination of Evidence"*; Memorandum No. UCB/ERL M79/24, Mar. 21, 1979; Electronics Research Laboratory, College of Engineering University of California, Berkeley, CA 94720 (pp. 1-12).
Form PCT/ISA/237; Written Opinion dated Jul. 14, 2017 in corresponding PCT Application No. PCT/US2017/030730 (8 pages).
Form PCT/ISA/210; International Search Report dated Jul. 14, 2017 in corresponding PCT Application No. PCT/US2017/030730 (5 pages).
Extended European Search Report dated Apr. 21, 2017 in corresponding European Patent Application No. 13788239.5 (10 pages).
Eugene Santos et al. *"Fusing multiple Bayesian knowledge sources"*, International Journal of Approximate Reasoning, vol. 52, No. 7, Feb. 12, 2011 (Feb. 12, 2011), pp. 935-947, XP028281551, ISSN: 0888-613X, DOI: 10.1016/J.IJAR.2011.01.008 [retrieved on Feb. 6, 2011] p. 935-946, paragraph 7.
Eugene Santos et al. *"A framework for building knowledge-bases under uncertainty"*, Jan. 13, 2001 (Jan. 13, 2011), pp. 1-36, XP055362615, retrieved from the Internet: URL: http://di2ag.thaver.dartmouth.edu/Papers/Journal/jetai-98.pdf. [retrieved on Apr. 6, 2017] p. 1-p. 34.
Peter Walley: *"Measures of uncertainty in 1-15 expert systems"*; Artificial Intelligence., vol. 83, No. 1, May 1, 1996 (May 1, 1996), pp. 1-58, XP055362628, NL ISSN: 0004-3702 (95) 00009-7 p. 1-p. 5.
Communication dated Feb. 5, 2019 in related European Patent Application No. 13 788 239.5 (7 pages).
Non-Final Office Action dated Feb. 21, 2019 in parent U.S. Appl. No. 15/584,874 (15 pages).
Notice of Allowance dated Jul. 8, 2019 in parent U.S. Appl. No. 15/584,874 (12 pages).
Corrected Notice of Allowance dated Sep. 3, 2019 in parent U.S. Appl. No. 15/584,874 (6 pages).
Extended European Search Report dated Oct. 16, 2019 in corresponding European Patent Application No. 17793206.8 (7 pages).
First Examination Report dated Jun. 1, 2020 in corresponding Indian Patent Application No. 8797/CHENP/2014 (7 pages).
Santos, Jr. et al.; "A large-scale distributed framework for information retrieval in large dynamic search spaces"; published online: Apr. 27, 2010; DOI: 10.1007/s10489-010-0229-0; (25 pages).
First Examination Report dated Sep. 10, 2021 in corresponding Indian Patent Application No. 201847045204 (6 pages).
Communication pursuant to Article to 94(3) EPC dated Oct. 1, 2021 in corresponding European Patent Application No. 17793206.8 (9 pages).
Extended European Search Report dated Oct. 22, 2021 in related European Patent Application No. 21159723.2 (12 pages).
Alison Callahan et al.; "HyQue: evaluating hypotheses using Semantic Web technologies"; Bio-Ontologies 2010: Semantic Applications in Life Sciences; Jul. 9-10, 2010; Journal of Biomedical Semantics 2011; (16 pages).
Non-Final Office Action dated Mar. 31, 2021 in co-pending U.S. Appl. No. 16/596,112 (22 pages).
Notice of Allowance dated Sep. 1, 2021 in co-pending U.S. Appl. No. 16/596,112 (11 pages).
Supplemental Notice of Allowance dated Sep. 14, 2021 in copending U.S. Appl. No. 16/596,112 (3 pages).
Corrected Notice of Allowance dated Sep. 30, 2021 in co-pending U.S. Appl. No. 16/596,112 (5 pages).
Corrected Notice of Allowance dated Dec. 9, 2021 in co-pending U.S. Appl. No. 16/596,112 (5 pages).
U.S. Appl. No. 62/331,642, filed May 4, 2016, Santos et al.
U.S. Appl. No. 15/587,917, filed May 5, 2017, Santos et al.
U.S. Appl. No. 15/584,874, filed May 2, 2017, Santos et al.
Canadian Office Action issued in Canadian Application No. 3,022,821 dated Jun. 23, 2023 in English.

A New Unification Process for AKB

Given an AKB $\kappa$, $L \in \mathcal{L}$, output $\delta_\kappa(L)$

302
- Let $\kappa^L = \kappa^D$ using Algorithm 6.1.
- Rewrite $L'$ in disjunctive-conjunctive normal form. In other words, $L' = L_1 \vee L_2 \cdots L_n$, where for every $1, 2, \cdots, n$, $L_i$ is a conjunction of atomic propositions in $\mathcal{L}$.
- Add to $\kappa^L$ all items of the form $(U \to L_i)$, where $i = 1, 2, \cdots, n$.
- Let $\delta_\kappa(L) = \emptyset$.
- Let $T$ consists of all distinct terms that appeared in $\kappa^L$.

304
- For each $A \equiv T$, associate the two lists, $Q(A) = \{\omega \in \kappa^L \mid A \in \rho(\omega)\}$ and $Q(A') = \{\omega \in C_\ast \kappa^L \mid A^C \in \rho(\omega)\}$.
- Compute $q(A) = \sum_{\omega \in \mathcal{E}(Q(A) \cup Q(A'))} \rho(\omega)$ for all $\Lambda \in T$.
- Remove from $\kappa^L$ all $\omega \in Q(A) \cup Q(A')$ where $q(A) = 0$.
- Remove from $T$ all $A$ with $q(A) = 0$.

306 $T = \emptyset$?

308 NO → Sort the $A \subset T$ in increasing order of $q(A)$ to obtain the ordered list $A_1, A_2, \ldots, A_n$.

310 list $A_1, A_2, \ldots, A_n$ empty?

312 NO
- Select the first element from the list, say $A$.
- Remove $A$ from $T$.
- For each $\omega_1 \in Q(A)$ and $\omega_2 \in Q(A')$:
  a. Construct $\omega_0 = \omega_1 \circ \omega_2$;
  b. Add $l(\omega_0)$ into $\delta_\kappa(L)$ if $\tau(\omega_0) = F$. Otherwise, add $\omega_0$ into $\kappa^L$.

YES (from 310) → back to 304

314 Output $\delta_\kappa(L)$.

FIG. 3

Unification Process with Tags

Given AKBs $\kappa_1, \kappa_2, \ldots, \kappa_n$, $L \in \mathcal{L}$, output $\delta t_\kappa(L)$:

402
- For each $\omega \in \kappa$, let $\eta(\omega) = \emptyset$.
- For $i = 1$ to $n$ and each $\omega \subset \kappa_i$, add $i$ to $\eta(\omega)$ if $\omega \subset \kappa_i$.
- Rewrite $L'$ in CNF over $\kappa$. In other words, $L' = L_1 \wedge L_2 \wedge \cdots \wedge L_m$, where for every $1, 2, \cdots, m$, $L_i$ is a disjunction of atomic propositions in $\mathcal{L}$.
- Add to $\kappa^L$ all items of the form $\omega_j = (U \to L_j)$ with tag $\eta(\omega_j) = \emptyset$, where $j = 1, 2, \cdots, m$.
- Let $\delta t_\kappa(L) = \emptyset$.
- Let $\mathcal{T}$ be the smallest subset of $\mathcal{L}_a$ such that $\mathcal{T}$ contains all $r(\omega)$ where $\omega \in \kappa$.

404
- For each $A \in \mathcal{T}$, associate the two lists, $Q(A) = \{\omega \in \kappa^L | A \in \rho(\omega)\}$ and $Q(A') = \{\omega \in \kappa^L | A' \in \rho(\omega)\}$.
- Compute $q(A) = \sum_{\omega \in r(A) \cup Q(A')} | \rho(\omega) |$ for all $A \in \mathcal{T}$.
- Remove from $\kappa^L$ all $\omega \in Q(A) \cup Q(A')$ where $q(A) = 0$.
- Remove from $\mathcal{T}$ all $A$ with $q(A) = 0$.

406 $\mathcal{T} = \emptyset$?

408 NO → Sort the $A \in \mathcal{T}$ in increasing order of $q(A)$ to obtain the ordered list $A_1, A_2, \cdots, A_n$.

410 list $A_1, A_2, \ldots, A_n$ empty?

412 NO →
- Select the first element from the list, say $A$.
- Remove $A$ from $\mathcal{T}$.
- For each $\omega_1 \in Q(A)$ and $\omega_2 \in Q(A')$:
  - Construct $\omega_0 = \omega_1 \diamond \omega_2$.
  - If $\omega_0$ is defined, do the following:
    - Let $\eta(\omega_0) = \eta(\omega_1) \cup \eta(\omega_2)$.
    - Add $\omega_0$ together with $\eta(\omega_0)$ into $\delta t_\kappa(L)$ if $r(\omega_0) = F$. Otherwise, add $\omega_0$ together with $\eta(\omega_0)$ into $\kappa^L$.

414 YES → Output $\delta t_\kappa(L)$.

FIG. 4

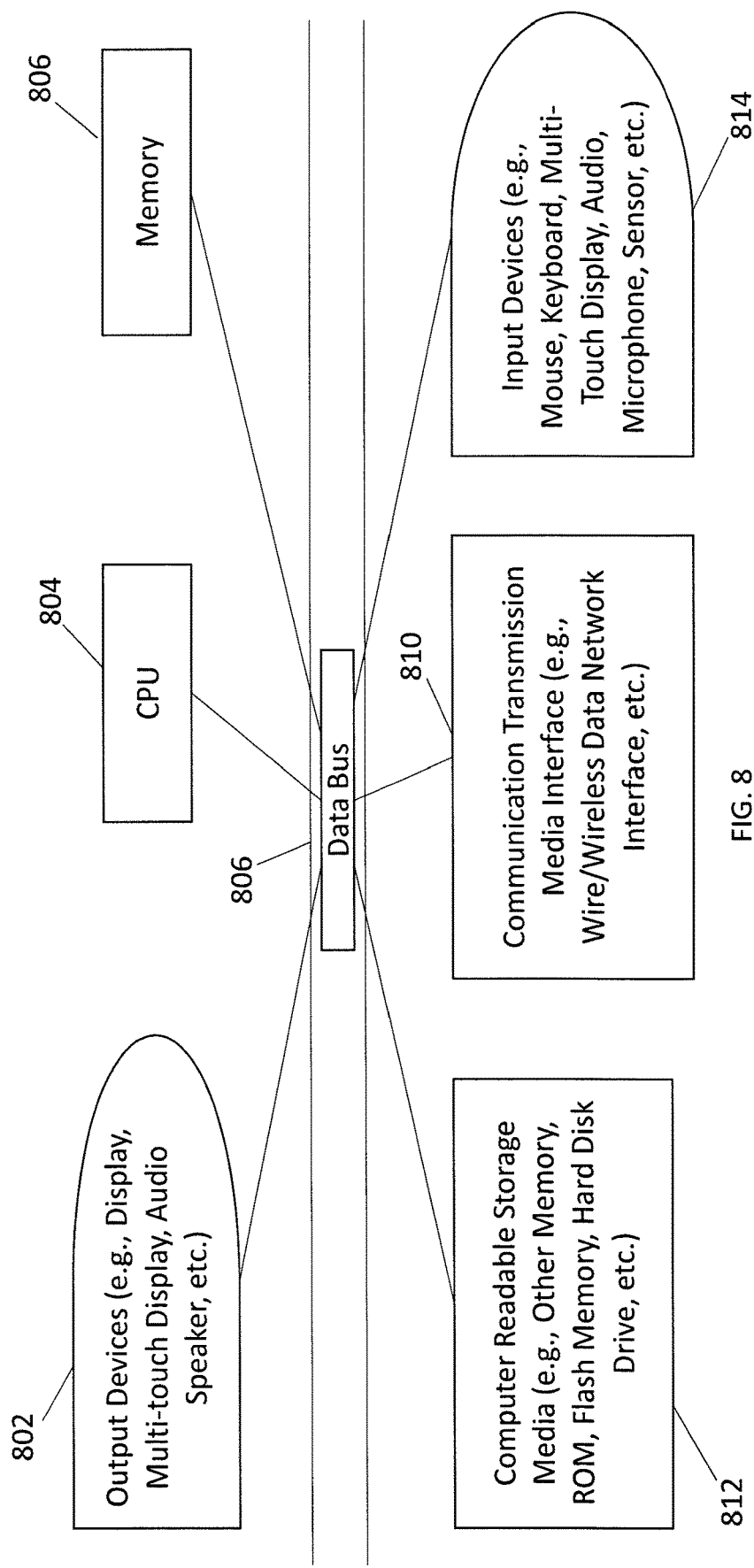

AUGMENTED EXPLORATION FOR BIG DATA AND BEYOND

CROSS-REFERENCE TO RELATED APPLICATIONS

This application is a continuation application of U.S. patent application Ser. No. 16/596,112, filed Oct. 8, 2019, which is a continuation application of U.S. patent application Ser. No. 15/584,874, filed May 2, 2017, which issued on Nov. 19, 2019 as U.S. Pat. No. 10,482,088, which is based upon and claims priority benefit to prior U.S. Provisional Patent Application No. 62/331,642 filed on May 4, 2016 in the US Patent and Trademark Office, the entire contents of all of which are incorporated herein by reference.

FIELD

The embodiments discussed relate to computer implemented big data (large and complex data set), information and knowledge processing.

BACKGROUND

The ability to extract knowledge from large and complex collections of digital data and information, as well as the utilization of these information and knowledge needs to be improved.

SUMMARY

According to an aspect of an embodiment, an apparatus including a memory and a processor coupled to the memory is to augment at least one of a plurality of digitized data input from a plurality of computerized data sources $d_1, d_2, \ldots, d_l$ forming a first set of evidences U to represent a first knowledge base (KB) among a plurality of KBs. A subset of concept graphs of nodes $c\alpha_{i_1}, c\alpha_{i_2}, \ldots, c\alpha_{i_h}$ from $c\alpha_1, c\alpha_2, \ldots, c\alpha_n$ is selected according to a computable measure of any one or combinations of consistency, inconsistency or priority threshold between $c\alpha_j$ in $c\alpha_1, c\alpha_2, \ldots, c\alpha_n$ to specification concept graph $spec_k$ in $spec_1, spec_2, \ldots, spec_m$. Knowledge fragments are generated for corresponding obtained subset of concept graphs $c\alpha_{i_1}, c\alpha_{i_2}, \ldots, c\alpha_{i_h}$ to include augmenting information objects by creating or adding into at least one KB among the KBs, new objects in form $\omega = E \rightarrow A$ from the concept fragments, including a computed validity (v) and a plausibility (p) for a combination of relationship constraints $C_K$ for the concept fragments and obtained propositions $\mathcal{A}_K$ for the fragment concepts.

These and other embodiments, together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF DRAWINGS

FIG. 3 is a flow chart of a unification process for the knowledge fragments, according to an embodiment.

FIG. 4 is flow chart of the unification process described in FIG. 3 with tags, according to an embodiment.

FIG. 8 is a functional block diagram of a computer, which is a machine, for implementing embodiments of the present invention.

DETAILED DESCRIPTION OF EMBODIMENT(S)

Figure 1:
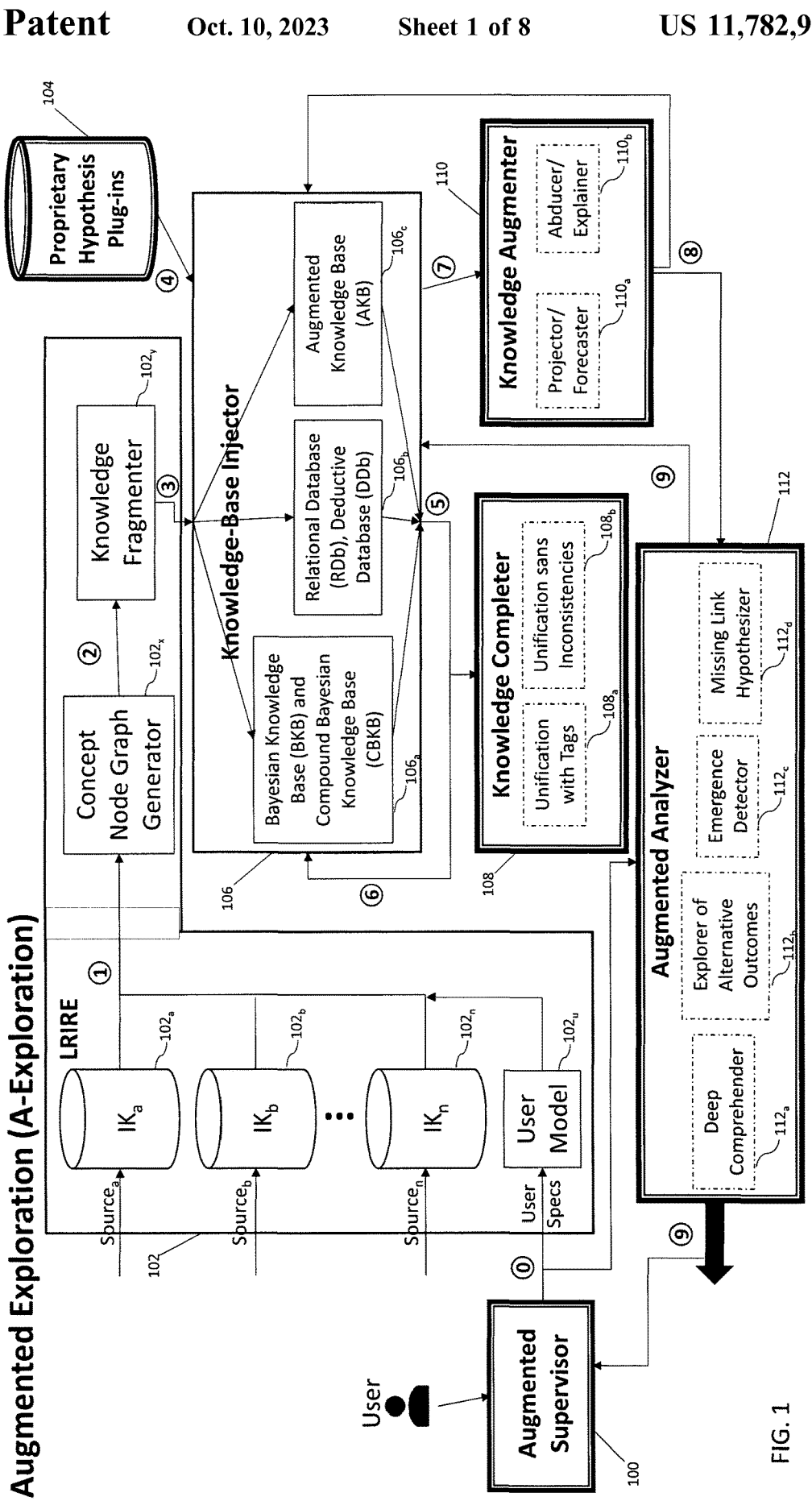
FIG. 1 is a functional block diagram of computer system functions, according to an embodiment.

The embodiments described in the attached description entitled "Augmented Exploration for Big Data and Beyond" can be implemented as an apparatus (a machine) that includes processing hardware configured, for example, by way of software executed by the processing hardware and/or by hardware logic circuitry, to perform the described features, functions, operations, and/or benefits.

Big Data refers to large and complex data sets, for example, data from at least two or more dynamic (i.e., modified in real-time in response to events, or updating) heterogeneous data sources (i.e., different domain and/or similar domain but different sources) which are stored in and retrievable from computer readable storage media. According to an aspect of embodiment, data can be text and/or image documents, data queried from a database or a combination thereof. The embodiments provide predictive analytics, user behavior analytics, or certain other advanced data analytics to extract value from data. More particularly, Big Data refers to the problem whereby the processing of large, complex, dynamic, and noisy data overwhelms current state of the art data processing software, thus limiting software applications to achieving only limited and/or simplistic tasks. Advanced tasks involving more complex data analytics such as semantics extraction or complex structure elicitation are in the purview of Big Data and in the search for innovative solutions, algorithms, and software application development.

According to an aspect of an embodiment, the data sources are interconnected computing devices or objects in heterogeneous domains (e.g., computers, vehicles, buildings, persons, animals, plants), as embedded with electronics, software, sensors to transceiver data over data networks including the Internet (Internet of Things (IoT)). According to another aspect of an embodiment, the data sources are Website content, including archived Website content.

Section 1. Augmented Exploration (A-Exploration)

The embodiments described provide a new and innovative approach—Augmented Exploration or A-Exploration—for working with Big Data, for example, to realize the "The White House Big Data Initiative" and more by utilizing Big Data's own power and exploiting its various unique properties. A-Exploration is a Comprehensive Computational Framework for Continuously Uncovering, Reasoning and Managing Big Data, Information and Knowledge. In addition to the built-in next generation real-time search engine, A-Exploration has the capabilities to continuously uncover, track, understand, analyze, manage, and/or utilize any desired information and knowledge, as well as, oversee, regulate and/or supervise the development, progression and/or evolvement of these information and knowledge.

A-Exploration supplements, extends, expands and integrates, among other things, the following related technologies:
1. Large-scale Real-time Information Retrieval and Extraction (LRIRE)
2. Bayesian Knowledge Base (BKB) and Compound Bayesian Knowledge Base (CBKB)
3. Augmented Knowledge Base (AKB) and Augmented Reasoning (AR)
4. Relational Database (RDb) and Deductive Database (DDb)
5. Users Modeling (UM)

The integrations and extensions of the above technologies, combined with new technologies described below:
1. Knowledge Completer (KC)
2. Knowledge Augmenter (KA)
3. Augmented Analyzer (AA)
4. Augmented Supervisor (AS)
5. Proprietary Hypothesis Plug-in (PHP), enable and empower A-Exploration to create and establish diverse methods and functionalities, capabilities to simplify and solve virtually all problems associated with Big Data, Information and Knowledge, including but not limited to:
1. Continuously Uncover and Track the Desired Information and Knowledge in real-time.
2. Enable, Produce and Generate Projection/Forecasting and Abduction.
3. Analysis and Deep Understanding of the Information/Knowledge.
4. Manage and Supervise the Progression and Evolution of the Information/Knowledge.
5. Detect, Verify and Anticipate Emergent Events and Behaviors.
6. Locate and Unearth the Missing Links between the Current Situations and the Eventual Desired Solutions.

Depending on the needs, other capabilities of A-Exploration may have to be supplemented, suspended, combined and/or adjusted.

The solutions and results mentioned above, require not only the extraction of enormous up-to-the-minute information, but also instantaneous analysis of the information obtained. Thus, new paradigms and novel approaches are necessary. One new paradigm includes not only the next generation scalable dynamic computational framework for large-scale information and knowledge retrieval in real-time, but also the capability to analyze immediately and seamlessly the partial and piece-meal information and knowledge acquired. Moreover, there is a need to be able to have a deep understanding of the different information and knowledge retrieved to perform the other required operations. Depending on the applications, A-Exploration can provide the necessary solution or simply provide the necessary information, knowledge and analyses to assist the decision makers in discovering the appropriate solutions and directions.

An example of a Big Data Research and Development Initiative is concerned with:
1. improving our ability to harness and extract knowledge and insights from large and complex collections of digital data, and
2. through it to help solve some of the Nation's most pressing challenges, including accelerate the pace of scientific discovery, environmental and biomedical research, education, and national security.

New and innovative process—Augmented Exploration or A-Exploration—is described for working with Big Data to realize the above initiative and more by utilizing Big Data's own power and exploiting its various unique properties. A-Exploration is a Comprehensive Computational Framework for Continuously Uncovering, Reasoning and Managing Big Data, Information and Knowledge. In addition to the built-in next generation real-time search engine, A-Exploration has the capabilities to continuously uncover, track, understand, analyze, manage, and/or utilize any desired information and knowledge, as well as, oversee, regulate and/or supervise the development, progression and/or evolution of these information and knowledge. This is one of the most challenging and all-encompassing aspects of Big Data, and is now possible due to the advances in information and communication infrastructures and information technology applications, such as mobile communications, cloud computing, automation of knowledge works, internet of things, etc.

A-Exploration allows organizations and policy makers to address and mitigate considerable challenges to capture the full benefit and potential of Big Data and Beyond. It contains many sequential and parallel phases and/or sub-systems required to control and handle its various operations. Individual phases, such as extracting, uncovering and understanding, have been used in other areas and examined in details using various approaches and tools, especially if the information is static and need NOT be acquired in real-time. However, overseeing and providing possible roadmap for management, utilization and projection of the outcomes and results obtained are regularly and primarily performed by human. Comprehensive formulations and tools to automate and integrate the latter are not currently available. Since enormous information is extracted and available to the human in the loop, information overload is clearly a significant problem. Last, but not the least, there exists no inclusive framework, at present, which consider all aspects of what are required, especially from a computational point of view, which makes it not viable for automation.

A-Exploration is vital and essential in practically any field that deals with information and/or knowledge, which covers virtually all areas in this Big Data era. It involves every areas discussed in James Manyika, Michael Chui, Brad Brown, Jacques Bughin, Richard Dobbs, Charles Roxburgh, and Angela Hung Byers, "Big data: The next frontier for innovation, competition, and productivity," Technical report, McKinsey Global Institute, 2011, including health care, public sector administration, retail, manufacturing, personal location data; and many other specific applications, such as dealing with unfolding stories, knowledge/information sharing and discovery, personal assistance, to name just a few. As a matter of fact, A-Exploration provides a general platform, as well as, diverse and compound methods and techniques to fulfill the goal of the above White House Big Data Research and Development Initiatives and more.

To solve the problems related to the different applications of A-Exploration, an important initial phase requires the harnessing and extracting of relevant information from vast amounts of dynamic heterogeneous sources quickly and under the pressure of limited resources. Unfortunately, most standard information retrieval techniques, see discussion by Amit Singhal, "Modern information retrieval: A brief overview," *Bulletin of the IEEE Computer Society Technical Committee on Data Engineering*, 24(4):35-43, 2001, do not have the necessary capabilities and/or may not be optimized for specific requirements needed.

The representation of the data fragments (also referred to as 'data nuggets') extracted is another potential problem. Most widely used representations, such as at least one or any combination of keywords, relationships among the data fragments (see FIG. 2, 204), expressions, vectors, etc. present hidden obstacles for the other phases involved. Even the most advanced existing representation—the concept graphs, see discussions by John F. Sowa, "Conceptual Graphs For A Database Interface," *IBM Journal of Research and Development*, 24(4):336-357, 1976, and Michel Chein and Marie-Laure Mugnier, "*Graph-based Knowledge Representation: Computational Foundations of Conceptual Graphs,*" Springer, 2009, suffer from the fact that it lacks reasoning capabilities to handle intelligent analyses and projections.

There are many available techniques for story understanding, see discussion in Erik T. Mueller, "Story Understanding Resources, <retrieved from Internet: http://xenia.media.mit-.edurmueller/storyund/storyres.html>. But virtually all were intended for static events and stories, which are not suitable for dynamic and real-time information and knowledge. Moreover, in A-Exploration, what may be needed is deep understanding of the various scenarios and relationships, as well as, possible consequences of the information and knowledge, depending on the applications.

One of the most difficult problems to overcome is how to manage, utilize and supervise the knowledge and insights obtained from the other phases to resolve the possible outcomes of the situations and to project into the future. Moreover, with sufficient information and knowledge of the situations, one may be able to help shape, influence, manipulate and/or direct how they will evolve/progress in the future. Furthermore, it may help and facilitate the discovery/invention of new and improved methods for solving the problem at hand. Currently, existing framework might not provide the users with the desired solutions, or even just to assist the intended users in making the appropriate decisions or to provide guidance to change the future statuses and/or courses in the desired/preferred directions.

Since typically everything might be performed under limited resources, allocating the resources, especially time and computing power, is another prime consideration. Besides the simple allocation strategies, such as random and round robin methods, other more sophisticated strategies can also be used in A-Exploration.

Section 2. Information and Knowledge

Information and knowledge (IK) come in many different flavors, and have many different properties. Moreover, IKs may be static or dynamic. Dynamic IKs may evolve, expand and/or progress, and may be subject to modification and/or alteration. They may also be combined or integrated with other IKs. The desirability or significance of specific IKs may depend on the applications. Except for proven or well-known IKs, in general, the importance of an IK may depend on the following characteristics:

1. Timeliness of the IKs.
2. Development, Expansion, Progression and/or Evolution of the IKs.
3. Volume and Diversity of the sources of the IKs.
4. Influence and Swiftness of the spreading to other IKs.
5. Intensity and Rapidity of the impact from other IKs.

FIG. 1 is a functional block diagram of computer system functions, according to an embodiment. Operations (0) through (9) are indicated in the diagram. The Augmented Supervisor 100 is a computer that processes inputs and commands (see factors (i) and/or (ii) below) from the user and/or another computing device. Manages, regulates, and supervises the development, progression, and evolution of information and knowledge, together with the creation of new information and knowledge. Guides the User Model (102u) and Augmented Analyzer (112).

LRIRE 102 is the web, external databases, and other information and knowledge (IK) repositories serve as sources (102a, 102b, . . . , 102n) of inputs. The inputs include structured data (e.g. forms, spreadsheets, website content, databases, etc.) and free-form data (e.g. unstructured text, live news feeds, etc.), or a combination (e.g. meta-data tags on html documents containing free text). Inputs are retrieved and organized based on any one or combination of two factors: (i) target query or domain specification (information retrieval), and (ii) specific user interests and preferences (User Modeling (102u)) as specified by a use and/or by a computing device. Output is the organized information and knowledge (IK) according to the factors (i) and/or (ii).

At 102x, Concept Node Graph Generator—Each piece of IK from each IK source (102a, . . . 102n) is translated into a concept graph representing the semantics of the IK.

At 102y, Knowledge Fragmenter—The collection of concept graphs are used to construct knowledge fragments. Knowledge fragments identify value relationships between concepts found in the concept graphs.

At 104, Proprietary Hypothesis Plug-Ins—Information and knowledge fragments that are proprietary to the user or organization that drives hypothesis formation and how this can shape the reasoning and analysis of A-Exploration could be injected the information/knowledge bases in 106.

At 106, Knowledge-Base Injector—The fragments are added into existing (or possibly empty) data/knowledge bases of varying forms (e.g. Relation DBs (106b), BKBs (106a), AKBs (106c), etc.). Injection translates the fragments into the appropriate database format. Each information/knowledge base can be directly accessed from 108 and 110.

At 108, Knowledge Completer—All/some IK is extracted from the information/knowledge bases in 106. Unification processes (with Tags (108a—FIG. 4) and sans Inconsistencies (108b—FIG. 5)) validates and/or creates new inductively generated knowledge that is then injected back into one or all information/knowledge bases as well as updating the User Model (102u).

Figure 6:
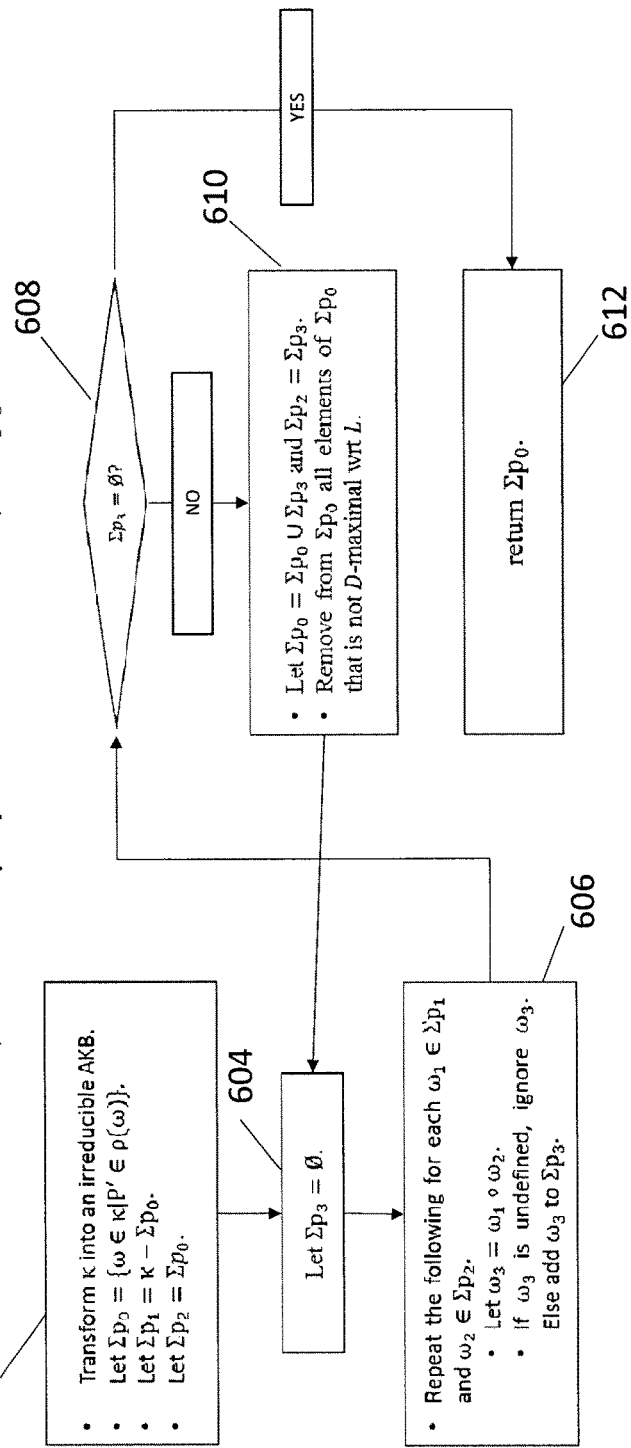
FIG. 6 is flow chart of determining projection/forecasting based upon the knowledge fragments, according to an embodiment.
Figure 7:
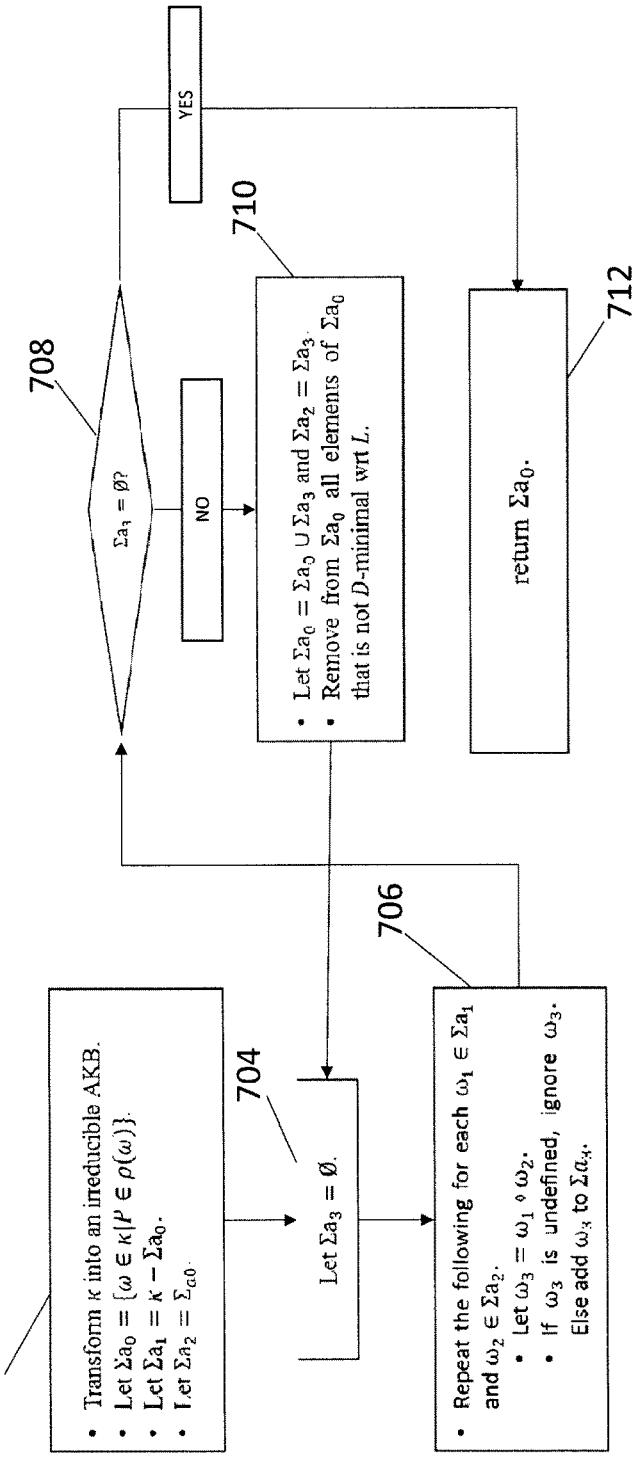
FIG. 7 is a flow chart of determining abduction for the knowledge fragments, according to an embodiment.

At 110, Knowledge Augmenter—Inspects information/knowledge bases and generates new knowledge through the Projector/Forecaster (110a—FIG. 6) and the Abducer/Explainer (110b—FIG. 7). Knowledge is injected back into one or all information/knowledge bases. Augmented knowledge is sent to the Augmented Analyzer (112) for processing.

At 112, Augmented Analyzer—Augmented analysis can produce new or existing IK such as through Deep Comprehender (112a), Explorer of Alternative Outcome (112b), Missing Link Hypothesizer (112d), detect unexpected or emergent phenomena such as through the Emergence Detector (112c) as well as other innovative technologies unique to Augmented Exploration. The output provides new augmented analysis which is also injected into the information/knowledge bases and to the Augmented Supervisor (100) for evolving stories and continuous analyses.

FIG. 1 pertains to new integration of related technologies (102 and 106) and new technologies (100, 104, 108, 110, and 112). More particularly, for example, according to an aspect of an embodiment, a computer system including at least one computer is configured to generate, at operation 2, specification concept graphs of nodes $spec_1$, $spec_2$, . . . $spec_m$ including concepts node and relation nodes according to at least one of a plurality of digitized data from user input (at operations 0, 1) from a plurality of computerized data sources $d_1, d_2, \ldots, d_l$ forming a first set of evidences U; generate, at operation 2, concept graphs of nodes $c\alpha_1$, $c\alpha_2, \ldots, c\alpha_n$ including concept nodes and relation nodes for corresponding obtained plurality of IKs $\alpha_1, \alpha_2, \ldots, \alpha_n$ (at operations 0, 1) forming a second set of evidences U;

At operation 2, select a subset of concept graphs of nodes $c\alpha_{i_1}, c\alpha_{i_2}, \ldots, c\alpha_{i_h}$ from $c\alpha_1, c\alpha_2, \ldots, c\alpha_n$ according to a computable measure of any one or combinations of consistency, inconsistency or priority (see equations (1)-(3)) threshold between each $c\alpha_j$ in $c\alpha_1, c\alpha_2, \ldots, c\alpha_n$ to each specification concept graph $spec_k$ in $spec_1, spec_2, \ldots, spec_m$; generate knowledge fragments for corresponding obtained subset of concept graphs $c\alpha_{i_1}, c\alpha_{i_2}, \ldots, c\alpha_{i_h}$. A knowledge fragment among the knowledge fragments storing a mapping of values to first and second sets of evidences U, where A is a rule among rules in the knowledge base, and E is a subset of the first and second sets of evidences U from the knowledge base that supports the rule A, so that the rule A is supportable by the subset of evidences E, according to the concept fragments.

At operation 3, the at least one computer is further configured to create or add into at least one among a plurality of knowledge-bases (KBs) for the corresponding knowledge fragments obtained by creating objects in form $\omega = E \rightarrow A$ from the concept fragments; determining relationship constraints $\mathcal{C}_\kappa$ in form of set relations among a plurality of subsets of evidences E for a plurality of the objects $\omega$. At operation 4, authorized proprietary hypothesis secured plug-in may provide other knowledge fragments.

At operation 5, any one or combination of knowledge completion functions of unification, including unification with tags and sans inconsistencies, is performed based upon the created objects $\omega$ so that a validity (v) and a plausibility (p) based upon atomic propositions among the rules A is computed for each object $\omega = E \rightarrow A$. Other knowledge augmenting functions based upon the created objects $\omega$ include, at operation 7, generating new knowledge through the Projector/Forecaster (110a—FIG. 6) and the Abducer/Explainer (110b—FIG. 7). Knowledge is injected back into one or all information/knowledge bases. At operation 8, Augmented knowledge may be further provided to the Augmented Analyzer (112) for processing through Deep Comprehender (112a), Explorer of Alternative Outcome (112b), Missing Link Hypothesizer (112d), detect unexpected or emergent phenomenons such as through the Emergence Detector (112c), which, at operation 9, may be further output in form of reports or user interface for further processing and re-input at operation 0.

The plurality of data sources 100 ($100_a \ldots {}_n$) store information and knowledge (IK) which are dynamic (i.e., modified in real-time in response to events, or updating) heterogeneous data (i.e., different domain and/or similar domain but different sources) in form of text and/or image. In case of 'knowledge,' the information includes meta data or semantic data indicative or representing a target knowledge. The concept graph generator 102 generates concept node graphs.

Figure 2:
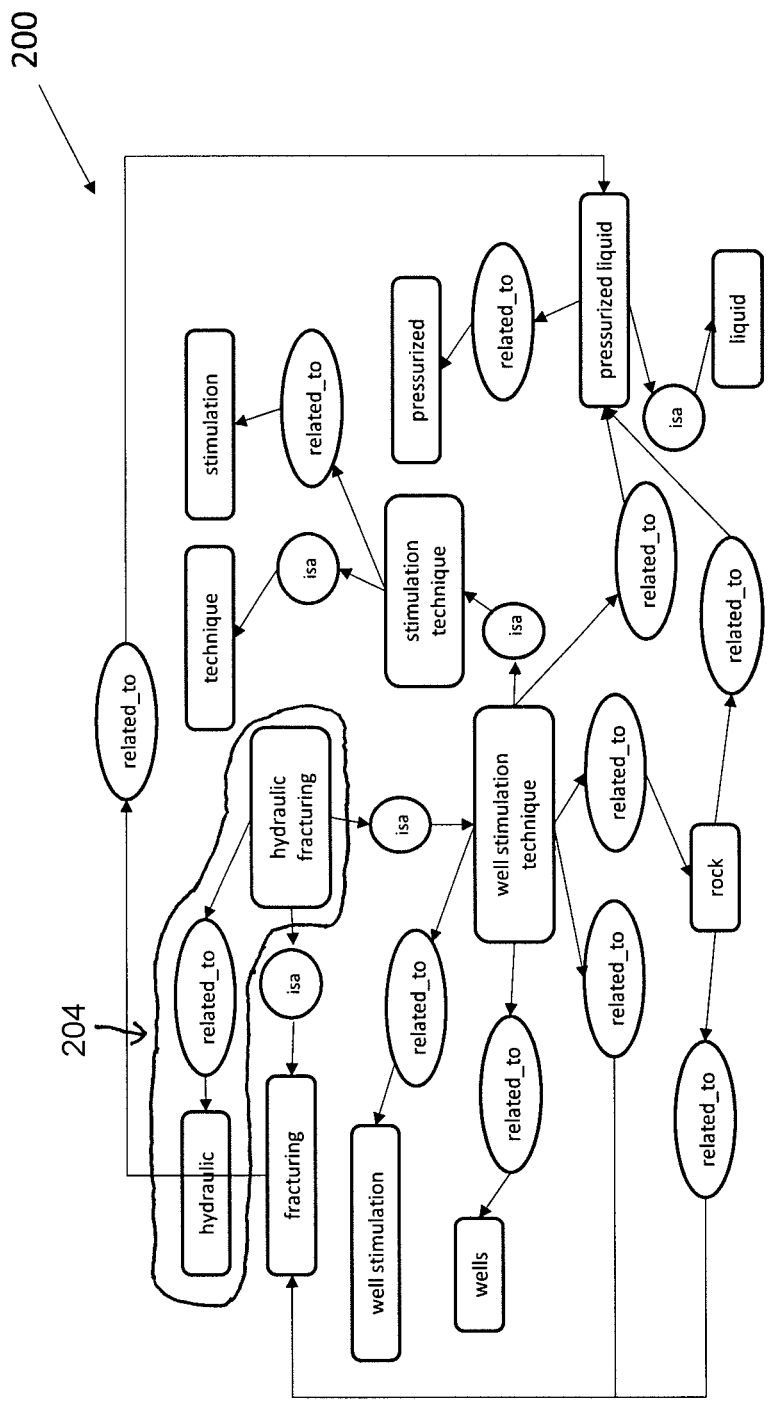
FIG. 2 is a diagram of concept node graphs, according to an embodiment.

To facilitate continuous uncovering and tracking, the desired IKs are normally represented using concept graphs. In a non-limiting example, FIG. 2 is a diagram of an example concept node graph 200 for hydraulic fracturing domain. In FIG. 2, the knowledge fragment 204 includes two keywords and a relation among the two keywords. The embodiments are not limited to a domain and data from any domain or combinations of domains can be utilized. Other representations, if needed, will be superimposed subsequently to enable and/or enhance the performance of other operations of A-Exploration.

Concept graph (CG) is a directed acyclic graph that includes concepts nodes and relation nodes. Consistency between two concept graphs, q and d, can be determined by a consistency measure:

$$\text{cons}(q,d) = n/(2*N) + m/(2*M), \quad (1)$$

where n, m are the number of concept and relation nodes of q matched in d, respectively, and N, M are the total number of concept and relation nodes in q. If a labeled concept node c occurs in both q and d, then c is called a match. Two labeled relation nodes are said to be matched if and only if at least one of their concept parents and one of their concept children are matched and they share the same relation label. In comparing two CGs that differ significantly in size (for example, a CG representing an entire document and another CG representing a user's query), the number of concept/entity nodes and relation nodes in the larger CG instead of the total number of nodes in both CGs, are used.

Equation 1 could be modified whenever necessary to provide more efficient measures to prioritize the resource allocations. For example, an inconsistency measure could be defined as follow:

$$\text{incons}(q,d) = \overline{n}/(2*N) + \overline{m}/(2*M), \quad (2)$$

where $\overline{n}, \overline{m}$ are the number of concept and relation nodes of q with no match in d, respectively, and N, M are the total number of concept and relation nodes in q, respectively. The priority measure is then given by:

$$\text{prty}(q,d) = \text{cons}(q,d) \, \text{incons}(q,d), \quad (3)$$

By working strictly with labeled graphs, instead of general graph isomorphism, problems associated with computational complexity is avoided.

It is assumed that each IK has at least two time-stamps: IK time-stamp, i.e., when the IK first appeared (initial or first version), and a representation time stamp, i.e., when the IK was last represented or modified (updated, second (new or subsequent) versions) in the system, also referred to as data version events. The latter is needed in connection with allocation strategies. For the sake of quick referencing, in addition to the representation time-stamp, a copy of the IK time-stamp is also available in the representation.

If the IKs came from the same or affiliated sources, then all those IKs will be combined and all contradictions resolved in favor of the later or latest versions.

Let the combined IK $\alpha$ consist of IKs $\alpha_1, \alpha_2, \ldots, \alpha_n$ from the same or affiliated sources with IK time-stamps $t_1, t_2, \ldots, t_n$, respectively, where $t_1 \leq t_2 \leq \ldots \leq t_n$. Then we shall say that $\alpha$ has IK time-stamp $t_n$. At time t, the diversity $D(\alpha, t)$ of $\alpha$ is the average of all $e^{t-t_i}$, and the volume $V(\alpha, t)$ of $\alpha$ is the sum of all $e^{t-t_i}$, where $i = 1, 2, \ldots, n$.

Any IK which is not a part of a combined IK is a stand-alone IK. For a stand-alone IK $\alpha$, at time t, the diversity $D(\alpha, t)$ and the volume $V(\alpha, t)$ of $\alpha$ are both equal to $e^{t-t_0}$, where $t_0$ is the IK time-stamp of $\alpha$.

The $e^{t-t_i}$ above represents the decaying factor of the IK, and depends on the unit of time used. Thus, the unit of time should be selected appropriately, and should be based on how fast-moving the IKs are.

Let $\alpha_1$ and $\alpha_2$ be two IKs where $\alpha_1$ and $\alpha_2$ need not be distinct. The consistency measure $m(\alpha_1, \alpha_2, t)$ between $\alpha_1$ and $\alpha_2$ at time t is given by:

$$m(\alpha_1, \alpha_2, t) = \text{cons}(r_1, r_2) \times e^{t - \min(t_1, t_2)}, \quad (4)$$

where $r_1$ and $r_2$ are the latest representation of $\alpha_1$ and $\alpha_2$, respectively, and $t_1$ and $t_2$ are IK time-stamps of $\alpha_1$ and $\alpha_2$, respectively.

Let $\alpha$ be a (combined or stand-alone) IK.
1. For time t, the diversity D ($\alpha$, t) of $\alpha$ is the sum of all m($\alpha$, $\alpha_0$, t)×D ($\alpha$, t) over all other combined or stand-alone IKs $\alpha_0$.
2. For time t, the volume V($\alpha$, t) of $\alpha$ is the sum of all m($\alpha$, $\alpha_0$, t)×V ($\alpha$, t) over all other combined or stand-alone IKs $\alpha_0$.

The diversity and volume of an IK also measure the timeliness and up-to-the minute changes of the IK. Thus, diversity and volume can be used to measure the importance and/or the significance of the IKs as they progress or evolve.

One of the disadvantages of the diversity and volume discussed above is that it is biased against new IKs. Fortunately, this could be partially mitigated by the proper selection of the time unit so that new and recent IKs will automatically be assigned a proportionally larger diversity and volume.

For any IK $\alpha$, there could be a lot of extraneous noises associated with a. To eliminate those noises and to cut down on the required computations, instead of including all other IKs, the diversity and volume will be determined only by those other IKs whose consistency measures with a are above a certain threshold. We shall refer to these as the truncated diversity and volume.

Since it is unlikely that one will be interested in all the IKs put forward by someone somewhere, it is advantageous to restrict the scope of the search. One such method is to use "watchwords" or "watch structures" to eliminate most of the unwanted IKs. (Watch structures are semantic structures consisting of watchwords, e.g., the query used in information retrieval. They can further sharpen the search for the desired IKs.) However, such screening could potentially overlook key IKs which may seem or is initially unrelated to the desired IKs. To alleviate the situation, one could widen the collection of watchwords or watch structures, as well as, adding watchwords or watch structures which may not be related but has a history of affecting and/or being affected by the IK in question. Historical semantic nets could be constructed in this regard based on historical connections among different ideas, concepts and processes.

According to the embodiments, metrics (Diversity and Volume) are provided to uncover and identify the desired IKs. However, to understand the significance and importance of these IKs, richer structural representations of the IKs are needed. Therefore, in the described framework, concept graphs are transformed into knowledge fragments, e.g., Bayesian Knowledge Fragments (BKF), Compound Bayesian Knowledge Fragments (CBKF), Augmented Knowledge Fragments (AKF), etc.

Section 3. Large-scale Real-Time Information Retrieval and Extraction (LRIRE)

As mentioned above, one of the major challenges that need to be addressed is the harnessing and extracting of relevant knowledge and insights from vast amounts of dynamic heterogeneous sources quickly and under the pressure of limited resources. To meet this challenge, the capabilities offered Large-scale Real-time Information Retrieval and Extraction (LRIRE) could be integrated with the other components of A-Exploration. However, the embodiments are not limited to LRIRE and other related computational frameworks, for example, related Anytime Anywhere Dynamic Retrieval ($A^2DR$) can be utilized in connection with A-Exploration described herein. LRIRE is an example of one of the next generation scalable dynamic computational frameworks for large-scale information and knowledge retrieval in real-time, which is described in an article by Eugene Santos, Jr., Eunice E. Santos, Hien Nguyen, Long Pan, and John Korah, "A largescale distributed framework for information retrieval in large dynamic search spaces," *Applied Intelligence*, 35:375-398, 2011.

The LRIRE incorporates various state-of-the-art successful technologies available for large-scale data and information retrieval. It is built by supplementing, extending, expanding and integrating the technologies initiated in I-FGM (Information Foraging, Gathering and Matching), see discussion by Eugene Santos, Jr., Eunice E. Santos, Hien Nguyen, Long Pan, and John Korah, "A Largescale Distributed Framework For Information Retrieval In Large Dynamic Search Spaces," *Applied Intelligence*, 35:375-398, 2011.

LRIRE's goal is to focus on the rapid retrieval of relevant information/documents from a dynamic information space and to represent the retrieved items in the most appropriate forms for future processing. With LRIRE, the information/documents in the search spaces are selected and processed incrementally using an anytime-anywhere intelligence resource allocation strategy and the results are provided to the users in real-time. Moreover, LRIRE is capable of exploiting users modeling (UM) to sharpen the inquiry in an attempt to dynamically capture the target behavior of the users.

In LRIRE the partial processing paradigm is enhanced by using highly efficient anytime-anywhere algorithms, which produces relevancy approximations proportional to the computational resources used. Anytime-anywhere algorithms were designed for both text and image documents: "Anytime refers to providing results at any given time and refining the results through time. Anywhere refers to incorporating new information wherever it happens and propagating it through the whole network."

LRIRE is an intelligent framework capable of incrementally and distributively gathers, processes, and matches information fragments in large heterogeneous dynamic search spaces, using anytime-anywhere technologies, as well as converting from one representation to another, when needed. The primary purpose of LRIRE is to assist the users at finding the pertinent information quickly and effectively, and to store them using the desired representations. Initially, the graphical structure of document graphs is ideal for anytime-anywhere processing as the overhead for adding new nodes and relations is minimal.

LRIRE is capable of handling retrieval of multiple data types, including unstructured texts (typical format for most databases/sources), images, signals, etc.

In LRIRE, the information acquired is initially represented as document graphs (DG). A DG is essentially a concept graph (CG). However, other representations, such as knowledge fragments, will be superimposed subsequently to make possible the necessary operations and enhance the performance of other aspects of LRIRE.

Multiple queries can proceed in parallel in LRIRE, but in this case, it is advisable to identify the queries.

LRIRE uses various common representations of information for heterogeneous data types. Thus, LRIRE provides a seamless integration of text, image and signals through various unifying semantic representation of contents.

Section 4. Bayesian Knowledge Base (BKB) and Compound Bayesian Knowledge Base (CBKB)

As mentioned above, the information and knowledge available in LRIRE are initially represented using CGs. To equip the accumulated knowledge with the ability to reason, the CGs may be transform into knowledge fragments, e.g., Bayesian Knowledge Fragments (BKF)s, Compound Bayesian Knowledge Fragments (CBKF)s and Augmented Knowledge Fragments (AKF)s, if needed. BKFs, CBKFs and AKFs are subsets of Bayesian Knowledge Base (BKB), Compound Bayesian Knowledge Base (CBKB) and Augmented Knowledge Base (AKB), respectively.

A Bayesian Knowledge Base (BKB), see discussion by Eugene Santos, Jr. and Eugene S. Santos, "A Framework For Building Knowledge-bases Under Uncertainty, "*Journal of Experimental and Theoretical Artificial Intelligence,*" 11:265-286, 1999 is a highly flexible, intuitive, and mathematically sound representation model of knowledge containing uncertainties.

To expand the usefulness of BKB in support of A-Exploration, a new object is developed and employed which is referred to as Compound Bayesian Knowledge Base (CBKB). In an CBKB, each S-node may be assign multiple values. Each value represents certain aspect of the rule and therefore is capable of more accurately reflect the different types of uncertainties involved.

For any given CBKB, depending on the needs, it can be considered whether just one specific value in the S-node, or a combination of certain specific group of values in the S-node. In this case, the resulting structure is similar to a BKB. However, it may or may not be an actual BKB, since it may or may not satisfy the "exclusivity" constraint of BKB. As a matter of fact, many BKB-like objects could be derived from a single CBKB.

The fusion technology available in BKB is expanded for use in CBKB. This is essential in connection with the LRIRE cited above, which forms a major component of A-Exploration. This allows the representation of the information fragments obtained by LRIRE at different instances and with diverse queries to be combined to form a joint CBKB.

The properties and structures of CBKBs are further enriched by encoding and distinguishing the node in a CBKB according to the types of relation given in the concepts or feature graphs. Besides the relation 'is-a', other relations exist between two concepts, such as 'is-located', 'is-colored', etc. For instance, using the relation 'is-located', we can view the node representing a location as a 'location' node.

Section 5. Augmented Knowledge Base (AKB) and Augmented Reasoning (AR). Augmented Knowledge Base (AKB) and Augmented Reasoning (AR) are discussed in U.S. Pat. No. 9,275,333 the content of which is incorporated herein by reference.

The following notations, definitions and results are described:

1. $\mathcal{L}$ represents a collection of propositions L closed under the operations: ' (not), $\wedge$ (and), and $\vee$ (or).
2. Ø and U are the empty set and the universal set—this could be set of anything under consideration, respectively.
3. If G is a subset of U, then G' is the complement of G, i.e., G'={x∈U|x∉G}.
4. T and F represent the logical constants TRUE and FALSE, respectively.
5. If S is a set, then $|S|$ is the cardinality of S, and $2^S$ is the collection of all subsets of S.

An Augmented Knowledge Base (AKB) (over $\mathcal{L}$ and U) is a collection of objects of the form (E, A), also denoted by E→A, where A∈$\mathcal{L}$ and E is the body of evidence that supports the proposition or rule A. E is a subset of some universal set U and L is a collection of propositions or rules A or a first order logic.

Various reasoning schemes can be used with AKBs, including Augmented Reasoning (AR), which is a new reasoning scheme, based on the Constraint Stochastic Independence Method, for determining the validity and/or plausibility of the body of evidence that supports any simple or composite knowledge obtainable from the rules/knowledge that is contained in the AKB, i.e., $\mathcal{L}$.

As a matter of fact, AKBs encompass most existing knowledge bases including their respective reasoning schemes, e.g., probabilistic logic, Dempster-Shafer, Bayesian Networks, Bayesian Knowledge Bases, etc. may be viewed or reformulated as special cases of AKBs. Moreover, AKBs and AR have pure probabilistic semantics and therefore not subject to any anomalies found in most of the existing knowledge bases and reasoning schemes. AKBs and AR are not only capable of solving virtually all the problems mentioned above, they can provide additional capabilities, e.g., inductive inferences with uncertainties and/or incompleteness, extraction of new knowledge, finding the missing link, augmented relational databases, augmented deductive databases, augmented inductive databases, etc. related to A-Exploration.

The A in (E→A) is a rule in κ, which is similar to a proposition or rule in a traditional knowledge base. On the other hand, the E in (E→A) is a set, which represents a body of evidence, and is not a rule.

Let κ be an AKB.

1. $\mathcal{A}_\kappa = \{A | (E \rightarrow A) \in \kappa \text{ for some } E\}$.
2. $\mathcal{C}_\kappa$ is the collection of all relations among the sets or bodies of evidence involved in κ. In other words, $\mathcal{C}_\kappa$ is the collection of all relations or constraints including, for example, any one or combination of subset, disjoint (e.g., empty intersection) partition, imposed on κ.
3. $\varepsilon_\kappa = \{G \subseteq U | G \text{ occurs in some E where } (E \rightarrow A) \in \kappa, \text{ or G occurs in } \mathcal{C}_\kappa\}$.

Let κ be an AKB. $\bar{\varepsilon}_\kappa$ is the smallest collection of subsets of U that contains all (approximately all) the sets in $\varepsilon_\kappa$ and is closed under complement, union, and intersection operators.

Measure (probabilistic or not) are usually associated with collection of evidence to specify their strength. Moreover, they are usually extended to cover $\bar{\varepsilon}_\kappa$. In the case where the measure is probabilistic, it can be interpreted as the probability that L is true.

Let κ be an AKB. $\hat{\kappa}$ is defined recursively as follows:

1. $(\emptyset \rightarrow_\kappa F), (U \rightarrow_\kappa T) \in \hat{\kappa}$.
2. if $\omega = (E \rightarrow_\kappa L) \in \kappa$ then $(E \rightarrow_\kappa L) \in \hat{\kappa}$.
3. if $\omega_1 = (E_1 \rightarrow_\kappa L_1)$, $\omega_2 = (E_2 \rightarrow_\kappa L_2) \in \hat{\kappa}$ then $\omega_1 \vee \omega_2 = ((E_1 \cup E_2) \rightarrow_\kappa (L_1 \vee L_2)) \in \hat{\kappa}$ and $\omega_1 \wedge \omega_2 = ((E_1 \cap E_2) \rightarrow_\kappa (L_1 \wedge L_2)) \in \hat{\kappa}$ $\hat{\kappa}$ extends κ so that AKBs can deal with composite objects ω, associated with combinations of sets of evidences E in the knowledge base and combinations of rules in the knowledge base. Therefore, the embodiments utilize both composite evidences and composite rules to establish support for a target rule. Since κ is finite, so is $\hat{\kappa}$. Members of $\hat{\kappa}$ are referred to as composite objects.

$\cup$ and $\cap$ denote 'set union' and 'set intersection', respectively, while $\vee$ and $\wedge$ denote 'logical or' and 'logical and', respectively.

Let κ be an AKB.

1. Let $\omega = (E \rightarrow_\kappa L) \in \hat{\kappa}$, then $l(\omega) = E$ and $r(\omega) = L$.
2. Let $\Omega \subseteq \hat{\kappa}$. $\{l(\omega) | \omega \in \Omega\}$ and $r(\Omega) = \{r(\omega) | \omega \in \Omega\}$.
3. Let $\omega_1, \omega_2 \in \hat{\kappa}$. $\omega_1 \equiv \omega_2$ if and only if $l(\omega_1) = l(\omega_2)$ and $r(\omega_1) \equiv r(\omega_2)$.

4. Let $\omega_1, \omega_2 \in \hat{\kappa}$. $\omega_1 \leq \omega_2$ if and only if $l(\omega_1) \subseteq l(\omega_2)$ and $r(\omega_1) \Rightarrow r(\omega_2)$.

If $\omega$ is a composite object, $l(\omega)$ denotes a composite set of evidences associated with $\omega$, and $r(\omega)$ denotes the composite rules associated with $\omega$. This enable $\hat{\kappa}$ to extract the rule portion and the associated set of evidences portion from $\omega$, where $\omega$ represents a composite object of a plurality of $E \rightarrow A$.

Let $\kappa$ be an AKB, $G \subseteq U$ and $L \in \mathcal{L}$. $G \xrightarrow{d}_{\kappa}$ if and only if there exists $\omega \in \hat{\kappa}$ such that $l(\omega) = G$ and $r(\omega) \Rightarrow L$.

Let $\kappa$ be an AKB and $L \in \mathcal{L}$. Then $\Sigma_\kappa(L) = \{\omega \in \hat{\kappa} | r(\omega) \Rightarrow L\}$, $\Sigma_\kappa^{\vee}(L) = \vee_{\omega \in \Sigma_\kappa(L)} \omega$, $\eta_\kappa(L) = r(\Sigma_\kappa^{\vee}(L))$, $\sigma_\kappa(L) = l(\Sigma_\kappa^{\vee}(L))$, and $\ddot{\sigma}_\kappa(L) = [\underline{\sigma}_\kappa(L')]'$.

$\sigma_\kappa(L)$ is the support of L wrt $\kappa$, while $\ddot{\sigma}_\kappa(L)$ is the plausibility of L wrt $\kappa$.

Various algorithms for determining $\sigma_\kappa(F)$, some polynomial and some non-polynomial may be provided.

Let $\kappa_1$ and $\kappa_2$ be AKBs. $\kappa_1$ and $\kappa_2$ are equivalent if and only if for all $L \in \mathcal{L}$, $\sigma_{\kappa_1}(L) = \sigma_{\kappa_2}(L)$.

Let $\kappa$ be an AKB. $\kappa$ is consistent if and only if $G = \emptyset$, subject to $\mathcal{C}_\kappa$, whenever $G \xrightarrow{d}_\kappa F$.

In general, consistency imposed certain conditions that the E's must satisfy.

Let $\kappa$ be an AKB, $G \subseteq U$ and $L \in \mathcal{L}$. $G \xrightarrow{i}_\kappa L$ if and only if there exists $L_0 \in \mathcal{L}$ such that $L \Rightarrow L_0$ and $G \rightarrow_\kappa L_0$.

Let $\kappa$ be an AKB and $L \in \mathcal{L}$. $\Phi_\kappa(L) = \{\omega \in \hat{\kappa} | L \Rightarrow r(\omega)\}$.

Let $\kappa$ be an AKB and $L \in \mathcal{L}$. Then $\phi_\kappa(L) = \cap_{\omega \in \Phi_\kappa(L)} l(\omega)$, subject to $\mathcal{L}_\kappa$, and $\underline{\phi}_\kappa(L) = [\phi_\kappa(L')]'$.

Let $\kappa$ be an AKB.
1. Let $\omega \in \hat{\kappa}$, $\omega'$ is defined recursively as follows:
   a) If $\omega = (E \rightarrow A)$ where $\omega \in \kappa$, then $\omega' = (E' \rightarrow A')$.
   b) If $\omega_1, \omega_2 \in \hat{\kappa}$, then $(\omega_1 \vee \omega_2)' = \omega_1' \wedge \omega_2'$ and $(\omega_1 \wedge \omega_2)' = \omega_1' \vee \omega_2'$.
2. Let $\Omega \subseteq \hat{\kappa}$. $\underline{\Omega} = \{\omega' | \omega \in \Omega\}$.
3. Let $\tau \subseteq \kappa$. $\underline{\tau} = \{\omega' | \omega \in \tau\}$. When $\underline{\kappa}$ is viewed as an AKB, then $\mathcal{C}_\kappa = \mathcal{C}_\kappa$.

Let $\kappa$ be an AKB and $L \in \mathcal{L}$. $\phi_\kappa(L) = \underline{\sigma}_\kappa(L)$ and $\underline{\phi}_\kappa(L) = \sigma_\kappa(L)$.

Let $\kappa_1$ and $\kappa_2$ be AKBs. $\kappa_1$ and $\kappa_2$ are i-equivalent if and only if for all $L \in \mathcal{L}$, $\phi_{\kappa_1}(L) = \phi_{\kappa_2}(L)$.

Let $\kappa$ be an AKB. $\kappa$ is i-consistent if and only if $G = U$, subject to $\mathcal{C}_\kappa$, whenever $G \not\subset T$.

An AKB $\kappa$ is disjunctive if and only if every $(E \rightarrow A) \in \kappa$, A is a conjunction of disjunctions of atomic propositions.

It is assumed that $\mathcal{P}_\kappa$ is the smallest collection of atomic propositions that satisfies the above definition.

Let $\kappa$ be an AKB. $\kappa$ is irreducible if and only if $\kappa$ satisfies the following conditions:
1. For every $\omega \in \kappa$, $l(\omega) \neq \emptyset$ and $r(\omega) \neq T$.
2. $\kappa$ is disjunctive.
3. For every $\omega_1, \omega_2 \in \kappa$, if $r(\omega_1) \Rightarrow r(\omega_2)$, then $l(\omega_1) \subseteq l(\omega_2)$.

Let $\kappa$ be an AKB. If $\omega \in \hat{\kappa}$, then $\rho(\omega)$ is the collection of all atomic propositions that occur in $r(\omega)$. Moreover, Let $\omega_1, \omega_2 \in \hat{\kappa}$. If both are atomic disjunction over $\kappa$, and there exists an atomic proposition P such that P occur in $\omega_1$ and P' occur in $\omega_2$, then $\omega_1 \diamond \omega_2$ merges $\omega_1$ and $\omega_2$ where a single occurrence of P and P' are removed.

Let $\mathcal{P} \subseteq \mathcal{L}_a$, the collection of all atomic propositions in L.
1. $\mathcal{P}' = \{P' | P \in \mathcal{P}\}$ and $\bar{\mathcal{P}} = \mathcal{P} \cup \mathcal{P}'$.
2. $\mathcal{P}^{\vee}$ is the collection of all $\vee_{P \in Q} P$ where $Q \subseteq \bar{\mathcal{P}}$. For completeness, $\vee_{P \in Q} P = F$ if $Q = \emptyset$.
3. $\mathcal{P}^{\wedge}$ is the collection of all $\wedge_{P \in Q} P$ where $Q \subseteq \bar{\mathcal{P}}$. For completeness, $\wedge_{P \in Q} P = T$ if $Q = \emptyset$.
4. $\tilde{\mathcal{P}}$ is the smallest collection of $\mathcal{L}$, containing $\mathcal{P}$ and closed under the operations: ' (not), $\wedge$ (and), and $\vee$ (or).

It can be shown that $\mathcal{P} \subseteq \bar{\mathcal{P}} \subseteq \mathcal{P}^{\vee} \downarrow \tilde{\mathcal{P}}$ and $\mathcal{P} \subseteq \bar{\mathcal{P}} \subseteq \mathcal{P}^{\wedge} \subseteq \tilde{\mathcal{P}}$.

Let $\mathcal{P} \subseteq \tilde{\mathcal{L}}_a$. $\mathcal{P}$ is simple if and only if for every $P \in \mathcal{L}_a$, not both P and P' are in $\mathcal{P}$.

Let $L \in \mathcal{L}$. L is $\vee$-simple if and only if for some simple $\mathcal{P} \subseteq \tilde{\mathcal{L}}_a$, $L = \vee_{P \in \mathcal{P}} P$.

Let $L \in \mathcal{L}$. L is $\wedge$-simple if and only if for some simple $\mathcal{P} \subseteq \tilde{\mathcal{L}}_a$. $L = \wedge_{P \in \tilde{\mathcal{L}}} P$.

In what follows, without loss of generality, we shall assume that L is $\vee$-simple whenever $L \in \mathcal{L}_a^{\vee}$, and L is $\wedge$-simple whenever $L \in \mathcal{L}_a^{\wedge}$.

Disjunctive AKB is introduced in U.S. Pat. No. 9,275,333 the content of which is incorporated herein by reference and an algorithm to transform any AKB to disjunctive AKB was given there. If $\kappa$ is an AKB, then $\kappa^D$ denotes the corresponding disjunctive AKB.

Let $\kappa$ be an AKB.
1. $\kappa$ is disjunctive if and only if $A \in \mathcal{L}_a^{\vee}$ for every $(E \rightarrow A) \in \kappa$.
2. $\kappa$ is conjunctive if and only if $A \in \mathcal{L}_a^{\wedge}$ for every $(E \rightarrow A) \in \kappa$.
3. $\mathcal{L}_\kappa$ is the collection of all atomic propositions that appear in $\kappa$.

Algorithm (Disjunctive AKB) Given an AKB $\kappa$. Return $\kappa_0$.
1. Let $\kappa_0 = \emptyset$.
2. For each $\omega \in \kappa$, do the following:
3. Express $r(\omega)$ in CNF over $\kappa$, i.e., $r(\omega) = L_1 \wedge L_2 \wedge \ldots \wedge L_k$, where $L_i$ is $\vee$-simple for each $i = 1, 2, \ldots, k$.
4. For each $i = 1, 2, \ldots, k$, add to $\kappa_0$ the object $l(\omega) \rightarrow L_i$.
5. Return $\kappa_0$.

Let $\kappa$ be a disjunctive AKB.
1. $\bar{\Omega}_\kappa = \{E \rightarrow A | E \subseteq U, A \in \bar{\mathcal{L}}_\kappa\}$.
2. $\hat{\Omega}_\kappa = \{E \rightarrow A | E \subseteq U, A \in \mathcal{L}_\kappa^{\vee}\}$
3. $\tilde{\Omega}_\kappa = \{E \rightarrow A | E \subseteq U, A \in \tilde{\mathcal{L}}_\kappa\}$.

Let $\emptyset = \Omega \subseteq \tilde{\Omega}_\kappa$. Then $\wedge_{w \in \Omega} \omega = (U \rightarrow T)$ and $\vee_{w \in \Omega} \omega = (\emptyset \rightarrow F)$. Let $\kappa$ be a irreducible AKB, $\omega_1, \omega_2 \in \hat{\Omega}_\kappa$ and $P \in \mathcal{L}_\kappa$. P is complemented with respect to $\omega_1$ and $\omega_2$ if and only if either $P \in \rho(\omega_1)$ and $P' \in \rho(\omega_2)$, or $P' \in \rho(\omega_1)$ and $P \in \rho(\omega_2)$.

Let $\kappa$ be a disjunctive AKB, $\omega_1, \omega_2 \in \hat{\Omega}_\kappa$ and $P \in \mathcal{L}_\kappa$. P is complemented with respect to $\omega_1$ and $\omega_2$ if and only if either $P \in \rho(\omega_1)$ and $P' \in \rho(\omega_2)$, or $P' \in \rho(\omega_1)$ and $P \in \rho(\omega_2)$.

Let $\kappa$ be a disjunctive AKB and $\omega_1, \omega_2 \in \hat{\Omega}_\kappa$.
1. $c(\omega_1, \omega_2)$ is the collection of all $P \in \mathcal{L}_\kappa$ where P is complemented with respect to $\omega_1$ and $\omega_2$.
1. $\omega_1 \between \omega_2$ if and only if $|c(\omega_1, \omega_2)| = 0$, i.e., $c(\omega_1, \omega_2) = \emptyset$.
2. Let $P \in \tilde{\mathcal{L}}_\kappa$.
4. $\omega_1 \between \omega_2$ if and only if $P \in \rho(\omega_1)$, $P \in \rho(\omega_2)$ and $\omega_1/P \approx \omega_2/P'$.
5. $\omega_1 \simeq^P \omega_2$ if and only if $P \in \rho(\omega_1)$, $P' \in \rho(\omega_2)$ and $\omega_1/P \approx \omega_2/P'$.
6. $\omega_1 \sim \omega_2$ if and only if $\omega_1 \sim \omega_2$ for some $P \in \tilde{\mathcal{L}}_\kappa$. In other words, $\omega_1 \sim \omega_2$ if and only if $|c(\omega_1, \omega_2)| = 1$.
7. $\omega_1 \simeq \omega_2$ if and only if $\omega_1 \simeq^P \omega_2$ for some $P \in \tilde{\mathcal{L}}_\kappa$.
8. If $\omega_1 \sim^P \omega_2$ where $P \in \tilde{\mathcal{L}}_\kappa$, then $\omega_1 \diamond \omega_2) \rightarrow r(\omega_1/P) \vee (\omega_2/P'))$. Otherwise, $\omega_1 \diamond \omega_2$ is not defined. In other words, $\omega_1 \diamond \omega_2$ merges $\omega_1$ and $\omega_2$ and removes both P and P'.

The $\diamond$ operator defined above is a powerful unification operator which is capable of handling uncertain knowledge in a natural manner. Therefore, it is a true generalization of the traditional unification operators.

Section 6. New Unification Algorithms and New Applications of Uncertainties

In what follows, it is assumed that κ is an AKB. AKB is further described in U.S. Pat. No. 9,275,333.

However, most of the time, instead of dealing with κ itself, we shall be dealing with $\kappa^D$. $\kappa^D$ is the disjunctive knowledge base associated with κ. Nevertheless, it is essential that κ be kept intact, especially if inductive reasoning is part of the solutions.

The unification algorithm below is different from related unification algorithms, including the unification algorithms discussed in U.S. Pat. No. 9,275,333, because according to an aspect of an embodiment, it is determined whether any atomic proposition A is selectable, and if there are any atomic propositions A, construct the two sets Q(A) and Q(A') and then combine the elements in Q(A) with the elements in Q(A') using the ◊ operations. The results are added into the knowledge base while discarding the original elements in Q(A) and Q(A').

Algorithm 6.1. (Unification). According to an aspect of an embodiment, unification refers to determining of the validity (in the case of deductive reasoning) of a target rule L. FIG. 3 is a flow chart of a unification process for the knowledge fragments, according to an embodiment. In FIG. 3, at 302, initialize a new knowledge base KL based on the original knowledge base κ and the target rule L. At 304, construct the sets from $\kappa^L$ which contains propositions involving A and complements of propositions A'. At 306, check whether or not there are still any atomic proposition left. At 308, arrange the atomic propositions in a list according to how often they occur. At 310, check whether or not the list is empty. At 312 process the first element of the list. At 314, output $\delta_\kappa(L)$ whose union represents the validity of L.

More specifically, given an AKB κ, L∈$\mathcal{L}$ output $\delta_\kappa(L)$, the collection of all $l(\omega)$ where $\omega \in \hat{\kappa}$ is and $l(\omega)$=F, as follows::

1. Let $\kappa^L = \kappa^D$, where $\kappa^L$ is an new AKB and $\kappa^D$ is the disjunctive AKB associated with κ.
2. Rewrite L' in disjunctive-conjunctive normal form. In other words, $L' = L_1 \vee L_2 \ldots L_n$, where for every 1, 2, ..., n, $L_i$ is a conjunction of atomic propositions. in $\mathcal{L}$. According to an aspect of an embodiment, an atomic proposition refers to a type of target rule that conveys the concept of a proposition such that a proposition is not made up of other propositions, for example A is an atomic proposition but A∨B is not. Some propositions or rules are atomic propositions or rules.
3. Add to $\kappa^L$ all items of the form (U→$L_i$), where i=1, 2, ..., n.
4. Initialize the output $\delta_\kappa(L) = \emptyset$.
5. Let $\mathcal{T}$ consists of all distinct terms or atomic propositions that appeared in $\kappa^L$. The As in $\mathcal{T}$ are atomic propositions or atomic rules.
6. For each A∈$\mathcal{T}$, associate the two lists of elements in $\kappa^L$, Q(A)={ω∈$\kappa^L$|A∈ρ(ω)} and Q(A')={ω∈$\kappa^L$|A'∈ρ(ω)}.
7. Compute $\bar{q}(A) = \Sigma_{\omega \in (Q(A) \cup Q(A'))} \rho(\omega)$ for all A∈$\mathcal{T}$.
8. Remove from $\omega^L$ all ω∈Q(A)∪Q(A') where $\bar{q}(A)$=0.
9. Remove from $\mathcal{T}$ all A with $\bar{q}(A)$=0.
10. If $\mathcal{T} = \emptyset$, go to Step 16.
11. Sort the A∈$\mathcal{T}$ in increasing order of $\bar{q}(A)$ to obtain the ordered list $A_1, A_2, A_n$.
12. If the ordered list given above is empty, go to Step 16. Otherwise, select the first element from the list, say A.
13. Remove A from $\mathcal{T}$.
14. For each $\omega_1$∈Q(A) and $\omega_2$∈Q(A'):
    a) Construct $\omega_0 = \omega_1 \diamond \omega_2$.
    b) Add $l(\omega_0)$ into $\delta_\kappa(L)$ if $r(\omega_0)$=F. Otherwise, add $\omega_0$ into $\kappa^L$.
15. Go back to Step 6 above and repeat the algorithm starting from that step.
16. Output $\delta_\kappa(L)$, which is set of composite objects to derive a validity value $\sigma_\kappa(L)$ for L (discussed below) based upon a union of the composite objects.

The above process may be modified for used as an Anytime-Anywhere algorithm. It does not require that $\kappa^L$ be determined completely in advance. It may be stopped anytime by executing Step 16, and continued at the place where it was stopped when more time are allocated. In addition, the algorithm can accept any addition to $\kappa^L$ while continuing the unification process. Finally, other heuristics may be used instead of or in addition to Step 6 given in the algorithm to improve the results, Anytime-Anywhere or otherwise.

Given AKB κ and L∈$\mathcal{L}$. $\sigma_\kappa(L) = \cup_{G \in \delta_\kappa(L)} G$, which is a value indicative of validity.

In Algorithm 6.1 above, let L=F. Then, we obtained the value of $\sigma_\kappa(F)$. Thus, the algorithm can determine whether κ is consistent or not. As a matter of fact, if E=∅ for every E∈$\delta_\kappa(F)$, then κ is consistent. Else, κ is not consistent.

Since for every L∈$\mathcal{L}$, $\sigma_\kappa(F) \subseteq \sigma_\kappa(L)$, the inconsistencies in κ will affect the unification process, including Algorithm 7.1. In the next section, we shall provide a new algorithm to perform unification while ignoring inconsistencies.

Due to the duality nature of deductively reasoning and inductive reasoning, the above unification method is applicable to both deductive reasoning and inductive reasoning. In the latter case, the AKB κ must be kept intact for constructing the $\underline{\kappa}$. $\kappa^D$ cannot be constructed from $\kappa^D$, i.e., $\underline{\kappa}^D \neq \kappa^D$. By the way, the unification method can be used with validity or plausibility measures.

Algorithm 6.1 is modified to introduce tags n to identify the sources of the results. In other words, the tags η(ω) indicate how the results were obtained for ω within the AKB. For example, if $\omega_1 = (E_1 \rightarrow A' \vee B)$, $\omega_2 = (E_2 \rightarrow A)$ are in the knowledge base then the tag for $\omega = (E_1 \wedge E_2 \rightarrow B)$ corresponds to $\omega_1$ and $\omega_2$. According to an embodiment, information indicating a tag is associated with ω.

Algorithm 6.2. (Unification with Tag).

FIG. 4 is flow chart of the unification process described in FIG. 3 with tags, according to an embodiment. At 402, 404, 406, 408, 410, and 414 is the same as in Algorithm 6.2. At 412, the tags are updated accordingly. $\delta t_\kappa(L)$ is as the same as in Algorithm 6.2 but with an associated tag.

Given an AKB $\kappa_1, \kappa_2, \ldots, \kappa_n$, L∈$\mathcal{L}$, output $\delta_\kappa(L)$:

1. Transform each $\kappa_1, \kappa_2, \ldots, \kappa_n$ into disjunctive AKBs, and let $\kappa = \cup_{i=1}^n \kappa_i$.
2. For each ω∈κ, let n(ω)=∅.
3. For i=1 to n and each ω∈κ, add i to η(ω) if ω∈$\kappa_i$.
4. Rewrite L' in CNF over κ. In other words, $L' = L_1 \wedge L_2 \wedge \ldots \wedge L_m$, where for every 1,2, ..., m, $L_i$ is a disjunction of atomic propositions in $\mathcal{L}$.
5. Add to $\kappa^L$ all items of the form $\omega_j = (U \rightarrow L_j)$ with tag η($\omega_j$)=∅, where j=1,2, ..., m.
6. Let $\delta t_\kappa(L) = \emptyset$.
7. Let $\mathcal{T}$ be the smallest subset of $\mathcal{L}_a$ such that $\mathcal{T}$ contains all r(ω) where ω∈κ.
8. Let $\mathcal{T}$ consists of all distinct terms that appeared in κ.
9. For each A∈$\mathcal{T}$, associate the two lists, Q(A)={ω∈$\kappa^L$|A∈ρ(ω)} and Q(A')={ω∈$\kappa^L$|A'∈ρ(ω)}.
10. Compute $\bar{q}(A) = \Sigma_{\omega \in (Q(A) \cup Q(A'))} |\rho(\omega)|$ for all A∈$\mathcal{T}$ 11. Remove from $\kappa^L$ all $\omega \in Q(A) \cup Q(A')$ where $\overline{q}(A)=0$.
12. Remove from $\mathcal{T}$ all A with $\overline{q}(A)=0$.
13. If $\mathcal{T} = \emptyset$, go to Step 19.
14. Sort the $A \in \mathcal{T}$ in increasing order of $\overline{q}(A)$ to obtain the ordered list $A_1, A_2 \ldots, A_q$.
15. If the ordered list given above is empty, go to Step 19. Otherwise, select the first element from the list, say A.
16. Remove A from $\mathcal{T}$.
17. For each $\omega_1 \in Q(A)$ and $\omega_2 \in Q(A')$:
    a) Construct $\omega_0 = \omega_1 \diamond \omega_2$.
    b) If $\omega_0$ is defined, do the following:
        i. Let $\eta(\omega_0) = \eta(\omega_1) \cup \eta(\omega_2)$.
        ii. Add $\omega_0$ together with $\eta(\omega_0)$ into $\delta_\kappa(L)$ if $r(\omega_0) = F$. Otherwise, add $\omega_0$ together with $\eta(\omega_0)$ into $\kappa^L$.
18. Go back to Step 9 above and repeat the algorithm starting from that step.
19. Output $\delta t_\kappa(L)$.

Observe that although Algorithm 6.2 is similar to Algorithm 6.1, however, tags are created only in the former.

Algorithm 6.3. (Unification sans Inconsistencies).

Figure 5:
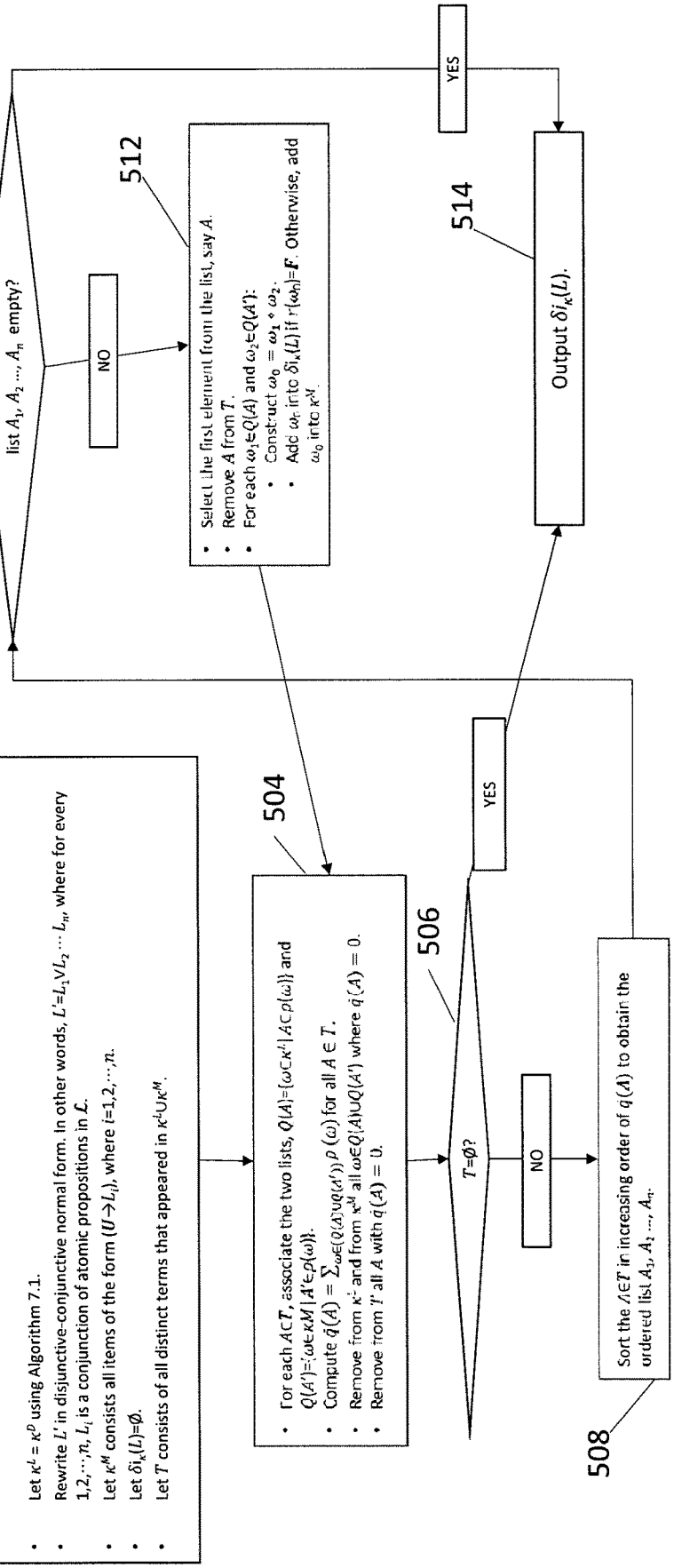
FIG. 5 is a flow chart of a unification process for the knowledge fragments without inconsistencies, according to an embodiment.

FIG. 5 is a flow chart of a unification process for the knowledge fragments without inconsistencies, according to an embodiment. At 502, initialize $\kappa^L$ based on the original knowledge base $\kappa$, $\kappa^M$ based on the target rule L. 504, similar to 304 but the two sets are constructed from $\kappa^L$ and $\kappa^M$, respectively. 506, 508, and 510 are same as 306, 308 and 310. 512 is similar to 312 but the result is put back in $\kappa^M$. At 514, output the result $\delta i_\kappa(L)$ whose union represents the validity of L, with all uncertainties removed.

Given an AKB $\kappa$, $L \in \mathcal{L}$, output $\delta_\kappa(L)$:
1. Transform $\kappa$ into a disjunctive AKB $\kappa^D$, and let $\kappa^L = \kappa^D$.
2. Rewrite L' in CNF over $\kappa$. In other words, $L' = L_1 \wedge L_2 \wedge \ldots \wedge L_n$, where for every $1, 2, \ldots, n$, $L_i$ is a disjunction of atomic propositions in $\mathcal{L}$.
3. Let $\kappa^M$ consists all items of the form $(U \rightarrow L_i)$, where $i=1,2, \ldots n$.
4. Let $\delta i_\kappa(L) = \emptyset$.
5. Let $\mathcal{T}_0$ be the smallest subset of $\mathcal{L}_a$ such that $\tilde{\mathcal{T}}_0$ contains all $r(\omega)$ where $\omega \in \kappa^L \cup \kappa^M$; and $\mathcal{T} = \tilde{\mathcal{T}}_0$.
6. For each $A \in \mathcal{T}$, associate the two lists, $Q(A) = \{\omega \in \kappa^L | A \in \rho(\omega)\}$ and $Q(A') = \{\omega \in \kappa^M | A' \in \rho(\omega)\}$.
7. Compute $\overline{q}(A) = \rho_{\omega \in (Q(A) \cup Q(A'))} |\rho(\omega)|$ for all $A \in \mathcal{T}$.
8. Remove from $\kappa^L$ and from $\kappa^M$ all $\omega \in Q(A) \cup Q(A')$ where $\overline{q}(A) = 0$.
9. Remove from $\mathcal{T}$ all A with $\overline{q}(A) = 0$.
10. If $\mathcal{T} = \emptyset$, go to Step 16.
11. Sort the $A \in \mathcal{T}$ in increasing order of $\overline{q}(A)$ to obtain the ordered list $A_1, A_2 \ldots, A_n$.
12. If the ordered list given above is empty, go to Step 3. Otherwise, select the first element from the list, say A.
13. Remove A from $\mathcal{T}$.
14. For each $\omega_1 \in Q(A)$ and $\omega_2 \in Q(A')$:
    a) Construct $\omega_0 = \omega_1 \diamond \omega_2$.
    b) Add $\omega_0$ into $\delta_\kappa(L)$ if $r(\omega_0) = F$. Otherwise, add $\omega_0$ into $\kappa^M$.
15. Go back to Step 6 above and repeat the algorithm starting from that step.
16. Output $\delta i_\kappa(L)$.

Let $\kappa$ be a consistent AKB and $L \in \mathcal{L}$. Then $\sigma_\kappa(L) = \bigcup_{\omega \in \delta i_\kappa(L)} l(\omega)$, where $\delta i_\kappa(L)$ is the output of Algorithm 6.3. Observe that in Algorithm 6.3, although inconsistencies may exist in $\kappa$ and may not be removed, they were approximately ignored during the unification process. It follows from the fact that in this unification process, we build two separate knowledge bases, $\kappa^L$ and $\kappa^M$. Since $\kappa^M$ started with the target, and it is always involved in the unification, therefore, any unifications produced by inconsistencies in the original knowledge base cannot happen. However, since the inconsistencies may permeate through the entire system, they may create many interesting properties and problems.

The decomposition of any $\omega \in \hat{\kappa}$ which will be needed in subsequent sections is examined.

Let $\kappa$ be an AKB, $\omega \in \hat{\kappa}$ and $\omega_i \in \kappa$ for $i=1,2, \ldots, n$.
1. $\omega$ is conjunctive if and only if $\omega = \omega_1 \wedge \omega_2 \wedge \ldots \wedge \omega_n = \wedge_{i=1}^n \omega_i$. Moreover, $\omega$ is minimal if and only if for $i=1,2,\ldots,n$ and $j=1,2,\ldots,n$ where $i \neq j$, $\omega_i \not\leq \omega_j$.
2. $\omega$ is disjunctive if and only if $\omega = \omega_1 \vee \omega_2 \vee \ldots \vee \omega_n = \vee_{i=1}^n \omega_i$. Moreover, $\omega$ is minimal if and only if for $i=1,2,\ldots,n$ and $j=1,2,\ldots,n$ where $i \neq j$, $\omega_j \not\leq \omega_i$.

Let $\kappa$ be an AKB and $\omega \in \kappa$. Let $\omega_i \in \kappa$ for $i=1,2,\ldots,n$.
1. $\omega$ is in disjunctive conjunctive form if and only if $\omega = \omega_1 \vee \omega_2 \vee \ldots \vee \omega_n$ where for each $i=1,2,\ldots,n$, $\omega_i \in \kappa$ and is minimal conjunctive. Each of the $\omega_i$ is called a conjunctive term. Moreover, $\omega$ is minimal if and only if for $i=1,2,\ldots,n$ and $j=1,2,\ldots,n$ where $i \neq j$, $\omega_i \neq \omega_j$.
2. $\omega$ is in conjunctive disjunctive form if and only if $\omega = \omega_1 \wedge \omega_2 \wedge \ldots \wedge \omega_n$ where for each $i=1,2,\ldots,n$, $\omega_i \in \kappa$ and is minimal disjunctive. Each of the $\omega_i$ is called a disjunctive term. Moreover, $\omega$ is minimal if and only if for $i=1,2,\ldots,n$ and $j=1,2,\ldots,n$ where $i \neq j$, $\omega_i \neq \omega_j$.

Let $\kappa$ be an AKB. Every $\omega \in \hat{\kappa}$ is can be put in minimal disjunctive-conjunctive form, as well as in minimal conjunctive-disjunctive form.

In view of the above Proposition, for simplicity and uniformity, unless otherwise stated, we shall assume that all $\omega \in \hat{\kappa}$ is are in minimal disjunctive-conjunctive forms. Of course, we could have chosen minimal conjunctive-disjunctive forms Let $\kappa$ be an AKB and $\omega_1$, $\omega_2 \in \hat{\kappa}$ is are expressed in minimal disjunctive-conjunctive forms.
1. $\omega_1 \subseteq \omega_2$ if and only if every conjunctive term in $\omega_1$ is in $\omega_2$.
2. $\omega_1 \cap \omega_2$ is the minimal disjunctive-conjunctive form which includes all the conjunctive terms that appeared in both $\omega_1$ and $\omega_2$.
3. $\omega_1 \cup \omega_2$ is the minimal disjunctive-conjunctive form which includes all the conjunctive terms that either appeared in $\omega_1$ or $\omega_2$.
4. $\omega_2 \ \omega_2$ is the minimal disjunctive-conjunctive form obtained by removing all the conjunctive terms that appeared in $\omega_2$ from $\omega_1$.

The same notations apply to minimal conjunctive-disjunctive forms.

The following Decomposition Rules are discussed in U.S. Pat. No. 9,275,333 the content of which is incorporated herein by reference.

Let $\kappa$ be an AKB and $L_1$, $L_2 \in \mathcal{L}$.
1. $\rho_\kappa(L_1) \cup \sigma_\kappa(L_2) \subseteq \sigma_\kappa(L_1 \vee L_2)$.
2. $\sigma_\kappa(L_1) \cap \sigma_\kappa(L_2) = \sigma_\kappa(L_1 \vee L_2)$.
3. $\underline{\sigma}_\kappa(L_1 \vee L_2) \subseteq \underline{\sigma}_\kappa(L_1) \cap \underline{\sigma}_\kappa(L_2)$.
4. $\underline{\sigma}_\kappa(L_1 \vee L_2) = \underline{\sigma}_\kappa(L_1) \cup \underline{\sigma}_\kappa(L_2)$.

Below, new extensions are provided of these rules:

Let $\kappa$ be an AKB, and $L_1$, $L_2 \in \mathcal{L}$.
1. If $L_1 \wedge L_2 = F$, then $\sigma_\kappa(L_1 \vee L_2) = \sigma_\kappa(L_1) \cup \sigma_\kappa(L_2)$.
2. If $L_1 \vee L_2 = T$, then $\underline{\sigma}_\kappa(L_1 \wedge L_2) = \underline{\sigma}_\kappa(L_1) \cap \underline{\sigma}_\kappa(L_2)$.
3. If $\kappa$ is consistent, then $\sigma_\kappa(L_1 \vee L_2) = \sigma_\kappa(L_1) \cup \sigma_\kappa(L_2)$.
4. If $\kappa$ is consistent, then $\underline{\sigma}_\kappa(L_1 \wedge L_2) = \underline{\sigma}_\kappa(L_1) \cap \underline{\sigma}_\kappa(L_2)$.

Let $\kappa$ be an AKB and $\omega \in \hat{\kappa}$. If $\omega$ is expressed in DNF over $\kappa$, where $\omega = \omega_1 \vee \omega_2 \vee \ldots \vee \omega_n$; then $\hat{\omega}$ is obtain from $\omega$ by removing all conjunctions $\omega_i$ from $\omega$ where $r(\omega_i) \Leftrightarrow F$ and $l(\omega_i) \neq \emptyset$. $\omega$ is called the purified $\omega$. Moreover, $\hat{k} = \{\hat{\omega} \in \hat{\kappa}\}$.

Let $\kappa$ be an AKB and $L \in \mathcal{L}$. Then $\hat{\sigma}_\kappa(L) = \bigcup_{\omega \in \delta i_\kappa(L)} l(\omega)$, where $\delta i_\kappa(L)$ is the output of Algorithm 6.3.

Since $\hat{\sigma}_\kappa(L) = \sigma_\kappa(L)$ if $\kappa$ is consistent, therefore, in this case, Algorithm 6.3 can be used to compute $\sigma_\kappa(L)$. Observe that Algorithm 6.3 is a faster unification algorithm than Algorithm 6.1.

Let $\kappa$ be an AKB and $L \in \mathcal{L}$.

1. $\grave{\Sigma}_\kappa(L) = \{\omega \in \hat{\kappa} | r(\omega) \Rightarrow L\}$, $\grave{\Sigma}_\kappa^\vee(L) = \bigvee_{\omega \in i_\kappa(L)} \omega$, $\grave{\sigma}_a(L) = 1$ ($\grave{\Sigma}_\kappa^\vee(L)$ and $\grave{\eta}_\kappa(L) = r(\grave{\Sigma}_\kappa^\vee(L))$).
2. $\grave{\Phi}_\kappa(L) = \{\omega \in \hat{\kappa} | L \Rightarrow r(\omega)\}$, $\grave{\Phi}_\kappa^\square(L) = \bigwedge_{\omega \in \Phi_\kappa(L)} \omega$, $\grave{\phi}_\kappa(L) = 1$ ($\grave{\Phi}_\kappa^\wedge(L)$ and $\grave{\zeta}_\kappa(L) = r(\grave{\Phi}_\kappa^\wedge(L))$).

From the definition, it follows that $\grave{\Sigma}_\kappa^\vee(L) \in \grave{\Sigma}_\kappa(L)$ and $\grave{\Phi}_\kappa^\wedge(L) \in \grave{\Phi}_\kappa(L)$.

Let $\kappa$ be an AKB. $\kappa$ is d-consistent if and only if $\grave{\sigma}_\kappa(L) = \sigma_\kappa(L)$ for every $L \in \mathcal{L}$.

The decomposition rules for $\grave{\sigma}_\kappa$ and $\grave{\sigma}_\kappa$ are given below:
Let $\kappa$ be an AKB and $L_1, L_2 \in \mathcal{L}$.
1. $\grave{\sigma}_\kappa(L_1) \cup \grave{\sigma}_\kappa(L_2) = \grave{\sigma}_\kappa(L_1 \vee L_2)$.
2. $\grave{\sigma}_\kappa(L_1) \cap \grave{\sigma}_\kappa(L_2) = \grave{\sigma}_\kappa(L_1 \wedge L_2)$.
3. $\grave{\sigma}_\kappa(L_1 \wedge L_2) = \grave{\sigma}_\kappa(L_1) \cap \grave{\sigma}_\kappa(L_2)$.
4. $\grave{\sigma}_\kappa(L_1 \vee L_2) = \grave{\sigma}_\kappa(L_1) \cup \grave{\sigma}_\kappa(L_2)$.

Section 7. Augmented Projection/Forecasting and Augmented Abduction

Deductive reasoning and inductive reasoning have been used to determine the validity and/or plausibility of any given proposition. In many applications, the desired proposition is not known. Instead, one is given some target propositions to determine the target propositions which can be deduced or induced from the AKB using these target propositions.

Projection and forecasting were used in Subsection on Information and Knowledge for the management and supervision of the evolution of the IKs, and abduction used for Analysis and Deep Understanding of IKs. We shall consider projection/forecasting and abduction in more general settings. We shall refer to the latter as Augmented Projection/Forecasting and Augmented Abduction—these form the basis for the Knowledge Augmenter (KA).

First, we shall introduce some new concepts and results. Moreover, we shall use them to design and develop various solutions for solving the Projection/Forecasting and Abduction problems, under different circumstances.

Let $\kappa$ be an AKB, and $L, L_1, L_2 \in \mathcal{L}$.

1. $L_2$ is a $\kappa$-deductive-consequent, or $\kappa$-DC, of $L_1$ if and only if $\sigma_\kappa(L_1 \Rightarrow L_2) \neq \emptyset$. The collection of all $\kappa$-DC of L will be denoted by $DC_\kappa(L)$. In other words, $DC_\kappa(L)$ consists of all $L_0 \in \mathcal{L}$ which can be deductively projected/forecast from L using the validity measures.
2. $L_1$ is a $\kappa$-deductive-antecedent, or $\kappa$-DA, of $L_2$ if and only if $\sigma_\kappa(L_1 \Rightarrow L_2) \neq \emptyset$. The collection of all $\kappa$-DA of L will be denoted by $DA_\kappa(L)$. In other words, $DA_\kappa(L)$ consists of all $L_0 \in \mathcal{L}$ which can be deductively abducted from L using the validity measures.
3. $L_2$ is a $\kappa$-inductive-consequent, or $\kappa$-IC, of $L_1$ if and only if $\phi_\kappa(L_1 \Rightarrow L_2) \neq \emptyset$. The collection of all $\kappa$-IC of L will be denoted by $IC_\kappa(L)$. In other words, $IC_\kappa(L)$ consists of all $L_0 \in \mathcal{L}$ which can be inductively projected/forecast from L using the validity measures.
4. $L_1$ is a $\kappa$-inductive-antecedent, or $\kappa$-IA, of $L_2$ if and only if $\phi_\kappa(L_1 \Rightarrow L_2) \neq \emptyset$. The collection of all $\kappa$-IA of L will be denoted by $IA_\kappa(L)$. In other words, $IA_\kappa(L)$ consists of all $L_0 \in \mathcal{L}$ which can be inductively abducted from L using the validity measures.

DC and IC may be viewed as projection/forecasting of the given proposition using deductive and inductive reasoning, respectively. In other words, DC is deductive projection/forecasting while IC is inductive projection/forecasting. On the other hand, DA and IA may be viewed as abduction of the given proposition using deductive and inductive reasoning, respectively. In other words, DA is deductive abduction while IA is inductive abduction. Existing abductive reasoning discussed by Eugene Charniak and Drew McDermott, "Introduction to Artificial Intelligence," Addison-Wesley, 1985, corresponds to deductive abduction given above.

Let $\kappa$ be an AKB and $L \in \mathcal{L}$.
1. $IC_\kappa(L) = DC_\kappa(L)$.
2. $IA_\kappa(L) = DA_\kappa(L)$.

Let $\kappa$ be an AKB and $L \in \mathcal{L}$.
1. If $\kappa_1$ and $\kappa_2$ are equivalent, then $DC_{\kappa_1}(L) = DC_{\kappa_2}(L)$ and $DA_{\kappa_1}(L) = DA_{\kappa_2}(L)$.
2. If $\kappa_1$ and $\kappa_2$ are i-equivalent, then $IC_{\kappa_1}(L) = IC_{\kappa_2}(L)$ and $IA_{\kappa_1}(L) = ID_{\kappa_2}(L)$.

DC and DA are concentrated upon. All the results obtained for DC and DA can then be transformed into IC and IA, respectively, by replacing $\kappa$ with $\underline{\kappa}$.

1. Let $L_0 \in DC_\kappa(L)$. $L_0$ is D-maximal wrt L if and only if for every $L_1 \in DC_\kappa(L)$, $L_1 \Rightarrow L_0$ implies $\sigma_\kappa(L_1 \Rightarrow L) \subseteq \sigma_\kappa(L_0 \Rightarrow L)$.
2. Let $L_0 \in DA_\kappa(L)$. $L_0$ is D-minimal wrt L if and only if for every $L_1 \in DA_\kappa(L)$, $L_0 \Rightarrow L_1$ implies $\sigma_\kappa(L_0 \Rightarrow L) \subseteq \sigma_\kappa(L_1 \Rightarrow L)$.

In general, construction of $dC_\kappa(L)$ and $dA_\kappa(L)$ can be done by adding $U \rightarrow A'$ and $U \rightarrow A$, respectively, and then performing unification.

Algorithm 7.1. Projection/Forecasting (Construction of $dC_\kappa(P)$)

FIG. 6 is flow chart of determining projection/forecasting based upon the knowledge fragments, according to an embodiment. At 602, initialize 3 new knowledge bases. At 604, initialize another new knowledge base $\Sigma_3$. At 606, apply unification unify the elements in $\Sigma_1$ and $\Sigma_2$, and place the results in $\Sigma_3$. At 608, check whether or not $\Sigma_3$ is empty. At 610, update $\Sigma_0$ and $\Sigma_2$ and remove certain elements from $\Sigma_0$. At 612, output $\Sigma_0$, the results of Projection/Forecasting on P.

Given AKB $\kappa$, an atomic proposition $P \in \mathcal{L}$, output $\Sigma_0$.
1. Transform $\kappa$ into an irreducible AKB.
2. Let $\Sigma p_0 = \{\omega \in \kappa | P' \in \Sigma(\omega)\}$.
3. Let $\Sigma p_1 = \kappa - \sigma_0$.
4. Let $\Sigma p_2 = \Sigma p_0$.
5. Let $\Sigma p_3 = \emptyset$.
6. Repeat the following for each $\omega_1 \in \Sigma p_1$ and $\omega_2 \in \Sigma p_2$.
7. Let $\omega_3 = \omega_1 \diamond \omega_2$.
8. If $\omega_3$ is undefined, ignore $\omega_3$. Else add $\omega_3$ to $\Sigma p_3$.
9. If $\Sigma p_3 = \emptyset$, return $\Sigma p_0$.
10. Let $\Sigma p_0 = \Sigma p_0 \cup \Sigma p_3$ and $\Sigma p_2 = \Sigma p_3$.
11. Remove from $\Sigma p_0$ all elements of $\Sigma p_0$ that is not D-maximal wrt L.
12. Go back to Step 5.

Algorithm 7.2. Abduction (Construction of $dA_\kappa(P)$)

FIG. 7 is a flow chart of determining abduction for the knowledge fragments, according to an embodiment. All blocks 702, 70 706, 708, 710 and 712, are the same as 602 to 612 except the initialization of $\Sigma_0$ uses P instead of P', and 710 uses D-minimal instead of D-maximal, and 712, output the results of abduction on P.

Given AKB $\kappa$, an atomic proposition $P \in \mathcal{L}$, output $\Sigma a_0$.
1. Transform $\kappa$ into an irreducible AKB.
2. Let $\Sigma a_0 = \{\omega \in \kappa | P \in \Sigma(\omega)\}$.
3. Let $\Sigma a_1 = \kappa - \Sigma a_0$.
4. Let $\Sigma a_2 = \Sigma a_0$.
5. Let $\Sigma a_3 = \emptyset$.

6. Repeat the following for each $\omega_1 \in \Sigma a_1$ and $\omega_2 \in \Sigma a_2$.
7. Let $\omega_3 = \omega_1 \diamond \omega_2$.
8. If $\omega_3$ is undefined, ignore $\omega_3$. Else add $\omega_3$ to $\Sigma a_3$.
9. If $\Sigma a_3 = \emptyset$, return $\Sigma a_0$.
10. Let $\Sigma a_0 = \Sigma a_0 \cup \Sigma a_3$ and $\Sigma a_2 = \Sigma a_3$.
11. Remove from $\Sigma a_0$ all elements of $\Sigma a_0$ that is not D-minimal wrt L.
12. Go back to Step 5.

Let $\kappa$ be an AKB and $L \in \mathcal{L}$. By expressing L as disjunction of conjunctions or conjunction of disjunctions, the Algorithms and results given above provide a complete solution for the construction of $dC_\kappa(L)$ and $dA_\kappa(L)$, i.e., projection/forecasting and abduction, respectively.

If $\kappa$ is endow with a probabilistic measure m together with its extension $\tilde{m}$, then $dC_\kappa(L)$ and/or $dA_\kappa(L)$ can be sorted in order of $\tilde{m}(\omega)$ for $\omega$ in $dC_\kappa(L)$ and/or $dA_\kappa(L)$. In this manner, the "best" or "most probable" projection/forecasting or abduction can be found at the top of the corresponding sorted lists. The remaining members of the sorted lists provide additional alternatives for projection/forecasting or abduction. A threshold for projection/forecasting and/or abduction can be enforced by removing all the members of the sorted lists according to certain specified value.

$iC_\kappa(L)$ and $iA_\kappa(L)$ can also be defined and constructed in a similar manner using $\underline{\kappa}$.

This Section shows how projection/forecasting and/or abduction can be realized given any propositions using either deductive or inductive reasoning based on the validity measures. All the above concepts and results can be carried over if plausibility measures are used. Moreover, if the AKB is consistent, then the use of plausibility measures could provide a wider range of projection/forecasting and/or abduction.

Given $L \in \mathcal{L}$, general methods for computing $dC_\kappa(L)$, $dA_\kappa(L)$, $iC_\kappa(L)$ and $iA_\kappa(L)$ are shown above. In other words, they provide a general solution for the projection/forecasting, as well as, the abduction problems.

Now consider $L \in \mathcal{L}$, if we are interested in projection/forecasting with respect to L, we can first determine $dA_\kappa(L)$, and then compute $dC_\kappa(dC_\kappa(L))$. The result represents the projection/forecasting of the possible sources which gave rise to L.

Let $\kappa$ be an AKB and $L \in \mathcal{L}$. Then $dC_\kappa(L) \subseteq dC_\kappa(dC_\kappa(L))$.

The $dC_\kappa(dC_\kappa(L))$ given above may be viewed as a second order projection/forecasting with respect to L. Obviously, we can continue in this fashion to obtain higher order projections/forecasting.

If we replace dC by dA, then we have higher order abductions if necessary. These are done deductively and with validity measures. In the same manner, we may consider higher order projections/forecasting and abductions done deductively and/or inductively with either the validity measures and/or plausibility measures. These could provide much wider ranges of results compare to first-order projections/forecasting and abductions alone, which were discussed earlier in this sections.

Section 8. A-Exploration

A-Exploration is an overall framework to accommodate and deal with the efforts and challenges mentioned above. It is intended to provide the capabilities to organize and understand, including the ramification of the IKs captured in real-time, as well as to manage, utilize and oversee these IKs to serve the intended users. Management of the IKs may include providing the necessary measures, whenever possible, to guide or redirect the courses of actions of the IKs, for the betterment of the users.

A. Introduction

As stated above, an important component of A-Exploration is the facilities to transform the representation of information fragments acquired by LRIRE into more robust and flexible representations—knowledge fragments. The various transformations, carried out in A-Exploration, are determined in such a way that it can optimally accomplish its tasks; e.g., transformation of CGs into CBKFs, CGs into AKFs, CBKFs into AKFs, AKFs into CBKFs, etc.

The transformation from CGs into CBKFs requires that we have the necessary knowledge about the relationships involving concepts and features. The requisite knowledge is normally available in semantic networks, word-net, etc. Although not necessary, due to the nature of CBKB, addition of probabilities will make the results of the transformation more precise. These probabilities could be specified as part of the semantic networks, etc. to represent the strength of the relationships. If no probabilities are specified, we may assume that they are 1. In any case, the probabilities given have to be adjusted when they are used in the CBKB to guarantee that they satisfy the requirements of the CBKB. The process of transforming DGs into CBKFs, including modification of the probabilities, can be easily accomplished and automated.

The main advantage of knowledge fragments, such as, CBKFs and AKFs, is the fact that they are parts of knowledge bases, and therefore are amenable to reasoning. This allows the possibility of pursuing and engaging in the various functions listed above, including the understanding and projecting the directions of further progression of the IKs, to foresee how they may influence other subjects and/or areas. Ways of accomplishing the functionalities listed above are discussed in more details below.

Methods and algorithms, introduced and/or presented in CBKBs and AKBs, are modified and tailored to analyze and understand the IKs. In particular, by identifying the pertinent inference graphs in a CBKB, it could provide the means to narrow down the analysis and supply the vehicle to explore deeper understanding of the IKs.

For CBKBs and AKBs, full analyses of the IKs can be performed deductively and/or abductively; while for AKBs, we can also perform the analyses inductively. These allow the presentations of a wider range of possibilities for understanding, comprehending and appreciating the ongoing evolution or progression of the IKs.

B. Comprehension, Analysis and Deep Understanding of IKs

Analyses of the IKs require deep understanding of many aspects of the IKs. It is backward looking and entails finding the best explanations for the various scenarios of the IKs. In other words, abduction is the key to analyses. Since both CBKBs and AKBs permit abduction, they can provide the instruments to analyze and better understand the IKs. This forms the basis for the Deep Comprehender subcomponent of the Augmented Analyzer (AA).

Abductive reasoning can be used in both CBKBs and AKBs with deductive reasoning. This permits a better understanding of the IKs and can provide the explanations of the possible courses/paths of how the IKs had evolved or progressed. Moreover, for AKB, abduction can be coupled not only with deduction (that is what existing abduction is all about), but can also be coupled with induction, and thereby allowing awareness and comprehension of suitable/fitting developments, generalizations and/or expansions of the desired IKs. For both CBKBs and AKBs, they can provide the following functionalities for A-Exploration:

1. Identify the Organization and Chronology of the Information and Knowledge.
2. Comprehend and Understand the Various Occurrences and Happenings.
3. Resolve and Establish the Reasons and Explanations for the Origins and Causes of the Various Incidences and Manifestations.
4. Determine the Causal Effects and Relationships of the Information and Knowledge.
5. Cognizant and Knowledge of Areas Related or Linked to the Information and Knowledge.

Since the power of abduction is the understanding and explanation of the IKs, resolutions of items above, which are related to Item 2 in the list of the functionalities of A-Exploration, can be achieved. In general, by exploiting and customizing (deductive or inductive) abduction, it may be possible to uncover the likely solutions.

C. Manage and Supervise the Evolution of the IKs

When employing only deductive inferencing, the results provided by the above procedures will be referred to as deductive prediction, projection, and/or forecasting. The same methods are equally applicable to inductive inference which is available for AKBs. Inductive prediction, projection and/or forecasting present much larger opportunities to produce more diverse results, which may be more informative and valuable to the question at hand.

Both CBKBs and AKBs have the capabilities of exploring for the desired/ideal alternative outcomes by management and supervising the evolution through user inputs taken into consideration through the user specifications $spec_1, \ldots spec_m$. Thus, they will permit A-Exploration to offer solutions to various functionalities such as those given below:
1. Appreciation and Conscious of the Likely Influences from External Subjects or Areas.
2. Awareness and Recognition of the Ramifications.
3. Verification and Anticipation of the Possible Spread and Impact to Other Areas.
4. Realization and Management of the Plausible Consequences.
5. Project, Predict and Forecast the Effects and Consequences of the Various Actions and Activities.
6. Instigate Measures to Supervise and Regulate the Information and Knowledge.
7. Initiate Credible Actions to Mitigate and/or Redirect the Plausible Effects and Outcomes of the Information and Knowledge.

Moreover, we can also customize and/or adapt various methods and algorithms, available for CBKBs and/or AKBs, to predict, project and/or forecast future directions of the IKs. This forms the basis for the Explorer of Alternative Outcomes subcomponent of the Augmented Analyzer (AA).

With CBKBs, predicting, projecting and/or forecasting based on knowledge of established or proven IKs (complete or partial) can be done using existing mechanisms available in any CBKBs. Since prediction, projection and/or forecasting are forward looking, the usual inference mechanisms can be exploited for that purpose. In CBKBs, this means:
1. Extraction of the essential knowledge from the knowledge bases in question.
2. Forms the inference graph(s).
3. Perform basic inferencing.

If more than one inference graphs are available, the results can be sorted according to the values of the inference graphs. In this case, different scenarios and their possible results may be offered to the intended users. When user input is taken into consideration, this forms the basis for the Augmented Supervisor (AS). The user input can be menu-based inputs and/or term-based inputs and/or natural language-based inputs and/or database inputs.

D. Proprietary Hypothesis Plug-Ins (PHP)

Most of the basic information and knowledge involved in the creation of the knowledge bases, such as AKB, CBKB, etc. are available in the public domain. Additional up-to-date information can be obtained using the LRIRE given in Section 4. These information and knowledge make up the bulk of the desired AKB, CBKB and other knowledge bases.

The requisite knowledge may also be available as proprietary hypothesis plug-ins, which allows the construction of proprietary knowledge bases, including AKFs, CBKFs, etc. A specific example of a proprietary hypothesis plug-in is the relation between a process and its efficacy, or a drug and how it is connected to certain illnesses.

Proprietary information (including patents and other intellectual properties, private notes and communications, etc.) form the backbone of most businesses or enterprises, and virtually all companies maintained certain proprietary information and knowledge. These can be used as proprietary hypothesis plug-ins. A collection of hypothesis plug-ins may be kept in proprietarily constructed semantic networks, AKBs, CBKBs, etc. Part or all of this collection may be made available under controlled permitted or authorized limited access when constructing the desired AKBs, CBKBs, etc. For large collection, LRIRE, or some simplified form of LRIRE, can be used to automate the selection of the relevant information and/or knowledge.

The availability of proprietary hypothesis plug-ins provides the owners with additional insights and knowledge not known to the outside world. It could offer the owners more opportunities to explore other possible outcomes to their exclusive advantages.

The available plug-ins could supply the missing portions in our exploration of the desired/ideal alternative outcomes. By the way, proprietary hypothesis plug-ins need not be comprised of only proven or established proprietary knowledge. They may contain interim/preliminary results, conjectures, suppositions, provisional experimental outcomes, etc. As stated above, when using AKBs, CBKBs, etc. to house the proprietary hypothesis plug-ins, the unproven items can be signified by specifying a lower probabilities and/or reliabilities.

Clearly, this collection of hypothesis plug-ins can grow as more proprietary information and knowledge, including intellectual properties, is accumulated. It could become one of the most valuable resources of the company.

E. Wrapping-Up

CBKBs and AKBs have the capabilities of inducing and/or exploring additional desired/ideal alternative outcomes for the IKs. This can be achieved by augmenting the knowledge bases with temporary, non-permanent and/or transitory knowledge fragments to the CBKBs or AKBs. The optional knowledge could consist of hypotheses generated using interim/partial/provisional results, conjectures, unproven or not completely proven outcomes, or simply guess works. To maintain the integrity of the knowledge bases, the validity and/or reliability of the added knowledge should be associated with lower probabilities and/or reliabilities. Or the non-permanent knowledge should be held in separate knowledge bases. At any rate, any unsubstantiated hypotheses or temporary items not deemed feasible or useful should be removed promptly from the knowledge bases. In cases where there are multiple alternative outcomes, they can be sorted so the intended users can select the desired options.

Section 11, below on Conjectures and Scientific Discoveries explores desired/ideal alternative outcomes, in connection with finding the "missing links" in scientific discoveries.

Due to the richness of the structures of CBKBs and AKBs, depending on the problem at hand, one could initiate and/or institute novel approaches and/or techniques to accomplish its goals.

The potential that CBKBs and AKBs are capable of handling and managing the above requirements and conditions is the main reason we have chosen CBKBs and/or AKBs to play a central role in A-Exploration.

Both CBKBs and AKBs can be used in A-Exploration to achieve the intended goals, especially if we are interested in deductive reasoning. However, CBKBs are more visual and allow the users to picture the possible scenarios and outcomes. On the other hand, though AKBs are more powerful, they are also more logical. Theoretically, anything that can be accomplished using CBKBs can be accomplished using AKBs, and more. Indeed, depending on the problems and/or IKs involved, it may be advantageous to formulate the problems using either or both CBKBs and AKBs, and to allow the switching from one formulation to the other, and vice versa. With the type of information/knowledge considered in A-Exploration, it is not difficult to transform and switch from one formulation to the other, and vice versa.

It is possible to have multiple A-Exploration systems, each having its own objectives. These A-Exploration systems may then be used to build larger systems in hierarchical and/or other fashions, depending on their needs. Clearly, these systems can cross-pollinate to enhance their overall effects. Various subsystems of different A-Exploration systems may be combined to optimize their functions, e.g. $A^2DR$.

Section 10. Emergent Events and Behaviors—subcomponent Emergence Detector of Augmented Analyzer (AA)

In this Section, we shall examine emergent behaviors, see discussion by Timothy O'Connor, Hong Yu Wong, and Edward N. Zalta, *"Emergent Properties,"* The Stanford Encyclopedia of Philosophy, 2012. They arise in a complex system mainly due to the interactions among the subsystems. Emergent behaviors are behaviors of the complex systems not manifested by the individual subsystems. When dealing with complex system, usually, emergent behaviors are generally unexpected and hard to predict. In this invention, we develop a formal characterization of emergent behavior and provide a means to quickly verify whether a behavior is emergent or not, especially with respect to AKBs. However, we shall first introduce a new object—consistent event and make use of a new method for unification without inconsistencies.

Consistent AKBs are defined as follows: Let $\kappa$ be an AKB. $\kappa$ is consistent if and only if $G=\emptyset$, subject to $\mathcal{C}_\kappa$, whenever $G \xrightarrow{d}_\kappa F$.

A new object—$\kappa$-consistent event is introduced herewith is essential in dealing with emergent behaviors, etc.: Let $\kappa$ be an AKB and $\omega \in \hat{\kappa}$. $\omega$ is a $\kappa$-consistent event if and only if for every $\omega_0 \in \hat{\kappa}$, if $r(\omega_0) = r(\omega)$, then $l(\omega_0) = l(\omega)$.

Let $\kappa$ be an AKB and $\omega \in \hat{\kappa}$. Let $\omega$ be expressed in minimal disjunctive-conjunctive form $\omega_1 \emptyset \omega_2 \vee \ldots \vee \omega_n$. Then $\check{\kappa}(\omega)$ is obtain from $\omega$ by removing all conjunctions $\omega_i$ from $\omega$ where $r(\omega_i) \equiv F$ and $l(\omega_i) \neq \emptyset$. Moreover, $\check{\kappa} = \{\check{\kappa}(\omega) | \omega \in \hat{\kappa}\}$.

Let $\kappa$ be an AKB and $\omega \in \hat{\kappa}$. $\omega$ is a $\kappa$-consistent event if and only if $\omega \in \check{\kappa}$.

The objects can also be associated with consistent events. In this case, we have created many new objects, and to distinguish them from the old ones, we shall represent them by adding an accent to these new objects, such as $\check{\sigma}$ for $\sigma$, etc.

For consistent events, the decomposition rules become:
Let $\kappa$ be an AKB and $L_1, L_2 \in \mathcal{L}$.
1. $\check{\sigma}_\kappa(L_1) \cup \check{\sigma}_\kappa(L_2) = \check{\sigma}_\kappa(L_1 \vee L_2)$.
2. $\check{\sigma}_\kappa(L_1) \bullet \check{\sigma}_\kappa(L_2) = \check{\sigma}_\kappa(L_1 \vee L_2)$.
3. $\underline{\check{\sigma}}_\kappa(L_1 \wedge L_2) = \underline{\check{\sigma}}_\kappa(L_1) \cap \underline{\check{\sigma}}_\kappa(L_2)$.
4. $\underline{\check{\sigma}}_\kappa(L_1 \vee L_2) = \underline{\check{\sigma}}_\kappa(L_1) \cup \underline{\check{\sigma}}_\kappa(L_2)$.

Let $\kappa$ be an AKB. $\kappa$ is consistent if and only if $\check{\sigma}_\kappa(L) = \sigma_\kappa(L)$ for every $L \in \mathcal{L}$.

Let $\kappa$ be an AKB and $L \in \mathcal{L}$. Then $\check{\sigma}_\kappa(L) = \cup_{\omega \in \delta_\kappa(L)} l(\omega)$, where $\delta_\kappa(L)$ is the output of Algorithm 7.3.

Since $\sigma_\kappa(L) = \check{\sigma}_\kappa(L)$, if $\kappa$ is consistent, then in this case, Algorithm 7.3 can be used to compute $\sigma_\kappa(L)$. Observe that Algorithm 7.3 is a faster unification algorithm than Algorithm 7.1.

Observe that in Algorithm 6.3, although inconsistencies may exist in $\kappa$ and may not be removed, they were completely ignored in the unification process. However, since the inconsistencies may permeate through the entire system, they may create many interesting properties and complications.

In the above discussions, we introduced deductive reasoning and inductive reasoning, and used them to determine the validity and/or plausibility of any given proposition. However, the validity and plausibility of a given proposition may be compromised due to inconsistencies. Although there are related algorithms for transforming any AKB $\kappa$ into a consistent AKB, we show in the previous section how to deal with inconsistencies directly without having to determine them in advance, as well as removing them first, i.e., by considering $\check{\kappa}$ instead of $\kappa$.

The related discussions involving AKBs dealt primarily with consistent AKBs. However, inconsistencies are an integral part of any AKBs involved with emergent behaviors. Various methods could be considered for removing the inconsistencies and constructing consistent AKBs to take their places. In this invention, we show how to deal with inconsistencies directly without having to determine them in advance, as well as removing them first. To avoid the complexities introduced by inconsistencies, we shall use $\check{\sigma}$ instead of $\sigma$, etc.

In the rest of the section, we shall assume that $n > 0$ and $\kappa_1, \kappa_2, \ldots, \kappa_n$ are AKBs. Moreover, $\kappa = \cup_{i=1}^n \kappa_i$, $\tau = \cup_{i=1}^n \hat{\kappa}_i$, and for $L \in \mathcal{L}$, $\Sigma(L) = \vee_{i=1}^n \Sigma_{\kappa_i}(L)$ and $\check{\Sigma}(L) = \vee_{i=1}^n \check{\Sigma}_{\kappa_i}(L)$. Moreover, $\sigma(L) = \cup_{i=1}^n \sigma_{\kappa_i}$, $\check{\tau} = \{\omega \in \check{\kappa} | \omega \in \tau\}$, and $\check{\sigma}(L) = \cup_{i=1}^n \check{\sigma}_{\kappa_i}$.

Clearly, $\tau \subseteq \check{\kappa}$ and $\check{\Sigma}(L) \subseteq \check{\Sigma}_\kappa(L)$. These differences provide a first step in the study of emergent events and behaviors. Moreover, due to the interaction among the various parts, inconsistencies invariably occurred when the parts are combined into the whole.

Let $L \in \mathcal{L}$ and $\omega \in \check{\kappa}$.
1. L is a d-valid $\kappa$-emergent behavior if and only if for all $i=1, 2, \ldots, n$, $\check{\sigma}_{\kappa_i}(L) \subset \check{\sigma}_\kappa(L)$.
2. L is a d-plausible $\kappa$-emergent behavior if and only if for all $i=1, 2, \ldots, n$, $\underline{\check{\sigma}}_{\kappa_i}(L) \in \underline{\check{\sigma}}_\kappa(L)$.
3. L is a i-valid $\kappa$-emergent behavior if and only if for all $i=1, 2, \ldots, n$, $\check{\phi}_{\kappa_i}(L) \subset \check{\phi}_\kappa(L)$.
4. L is a i-plausible $\kappa$-emergent behavior if and only if for all $i=1, 2, \ldots, n$, $\underline{\check{\phi}}_{\kappa_i}(L) \subset \underline{\check{\phi}}_\kappa(L)$.
5. $\omega$ is a (d-valid, d-plausible, i-valid, i-plausible) $\kappa$-emergent event if and only if $r(\omega)$ is a (d-valid, d-plausible, i-valid, i-plausible) $\kappa$-emergent behavior.

Let $L \in \mathcal{L}$ and $\omega \in \check{\kappa}$. If L is a (d-valid, d-plausible, i-valid, i-plausible) $\kappa$-emergent behavior, then $(\check{\sigma}_\kappa(L) \neq \emptyset, \underline{\check{\sigma}}_\kappa(L) \neq \emptyset, \check{\phi}_\kappa(L) \neq \emptyset, \underline{\check{\phi}}_\kappa(L) \neq \emptyset)$.

Example 1. Let $\kappa_1=\{E_1\to B\}$ and $\kappa_2=\{E_2\to(B\Rightarrow C)\}$. If $(E_1\cap E_2)\neq\emptyset$, then $((E_1\cap E_2)\to C$ is a d-valid $\kappa$-emergent event, and C is a d-valid $\kappa$-emergent behavior.

Let $L\in\mathcal{L}$. L is a (d-valid, d-plausible, i-valid, i-plausible) $\kappa$-non-emergent behavior if and only if L is NOT a (d-valid, d-plausible, i-valid, i-plausible) $\kappa$-emergent behavior.

In view of one of the algorithm shown above, we may assume that the $\kappa_i$ as well as $\kappa$ are all disjunctive. Moreover, given $L\in\mathcal{L}$, L can be expressed in atomic CNF form. Thus, we can use these to determine whether L is a d-valid $\kappa$-emergent behavior or not. More precisely:

Algorithm 10.1. (Algorithm for determining whether L is a $\kappa$-emergent behavior or not) Given AKB $\kappa_i$, i=1,2, ..., n, $\kappa=\cup_{i=1}^n \kappa_i$ and $L\in\mathcal{L}$, determine whether L is a $\kappa$-emergent behavior or not.

1. Transform $\kappa$ and $\kappa_i$, i=1,2, ..., n into disjunctive AKB.
2. Express L in atomic CNF form over $\kappa$ and over $\kappa_i$, i=1,2, ..., n.
3. Find $\hat{\sigma}_\kappa(L)$ and $\hat{\sigma}_{\kappa_i}(L)$, i=1,2, ..., n, using $\hat{\sigma}_\kappa(L_1)\cup\hat{\sigma}_\kappa(L_2)=\hat{\sigma}_\kappa(L_1\vee L_2)$, and $\hat{\sigma}_\kappa(L_1)\cap\hat{\sigma}_\kappa(L_2)=\hat{\sigma}_\kappa(L_1\wedge L_2)$.
4. Use the definition to determine whether L is a $\kappa$-emergent behavior or not, and output the result.

Step 3 in the above algorithm requires the values of $\hat{\sigma}_\kappa(P)$ and $\hat{\sigma}_{\kappa_i}(P)$, i=1,2, ..., n, for $P\in\mathcal{P}_\kappa$. To facilitates matters and avoid repeated calculations, we can predetermine all these values and store them for easy access later. In this manner, Algorithm 10.1 can work quickly when needed.

The cases involving d-plausible, i-valid, and i-plausible can be processed in similar manners.

Section 11. Conjectures and Scientific Discoveries—Missing Link Missing Link Hypothesizer subcomponent of Augmented Analyzer (AA)

Conjectures, see discussion by Karl Popper, "*Conjectures and Refutations: The Growth of Scientific Knowledge,*" Routledge, 1963, play a very important role in scientific and other discoveries. Conjectures maybe derived from experiences, educated guesses, findings from similar or related problems, preliminary experimental outcomes, etc. In general, they provide the missing links to clues in the discoveries. However, for most discoveries, there might be many clues or conjectures and it may be expensive to pursue the clues in general and/or to pursue the clues individually (as a matter of fact, it might be very costly even to pursue just a single clue). We shall show how AKBs, and similarly structured knowledge bases and systems, such as CBKBs, can be used to simplify and accelerate the search for the missing links.

Let $\kappa$ be an AKB and m a $\kappa$-measure.
1. A conjecture over $\kappa$ is an object of the form $E\to L$ where $L\in\mathcal{L}$ and $E\subseteq U$ but m(E) may or may not be known, or subject to changes.
2. Let $\lambda$ be a collection of conjectures over $\kappa$. Then $\kappa\cup\lambda$ is the $\lambda$-conjectured AKB wrt $\kappa$. In this case, we shall refer to $\kappa\cup\lambda$ as a conjectured AKB.

We shall occasionally refer to $\lambda$ alone as the conjectures.

In our discussion of conjectured AKBs, we are usually not concern with the measures. Thus, we shall view conjectured AKBs as ordinary AKBs. When the measures become part of the discussions, then the measures will be stated explicitly.

The central elements for finding the missing links are either the sets $\Gamma$ or the sets $\Phi$. In the first case, deductive inference is used, while in the second case, inductive inference is used. In either case, the measures need not be specified.

Since $\sigma$ and $\phi$ are derive solely from $\Sigma$ and $\Phi$, respectively, therefore, they are not affected by the measures either.

Because of the flexibility of the AKB, we can have conjectures $(E_1\to L)$ and $(E_2\to L)$, both in $\lambda$. The two essentially referred to the same conjecture L. The difference between them is the set associated with L, i.e., $E_1$ and $E_2$. This allows us to specify different constraints involving $E_1$ and $E_2$.

Let $\kappa$ be an AKB and $\lambda$ a collection of conjectures over $\kappa$. Let $L\in\mathcal{L}$ be the knowledge we want to assert. If $\sigma_{\kappa\cup\lambda}(L)$ does not contain any element in $\lambda$, then none of the conjectures will help in the establishment of L. In other words, the missing links are still out of reach, especially if the extended measure $\tilde{m}(\sigma_{\kappa\cup\lambda}(L))$ is smaller than desired. Modifications or additions of the conjectures are therefore indicated.

Similar conclusions follow if we replaced $\sigma$ in the above by $\underline{\sigma}$, $\phi$ or $\hat{\phi}$.

If some of the conjectures appeared in $\sigma_{\kappa\cup\lambda}(L)$, then it may be useful to closely examined $\Sigma_{\kappa\cup\lambda}(L)$ and/or $_{\kappa\cup\lambda}(L)$. We shall concentrate on $\Sigma_{\kappa\cup\lambda}(L)$ for the time being.

Let $\kappa$ be an AKB and $\omega\in\hat{\kappa}$.
1. $\omega$ is a conjunction over $\kappa$ if and only if $\omega$ can be expressed in the form $\mu_1\wedge\mu_2\wedge\ldots\wedge\mu_n$ where $n\geq 1$ and for all $i\leq n$, $\mu_i\in\kappa$.
2. $\omega$ is a disjunction over $\kappa$ if and only if $\omega$ can be expressed in the form $\mu_1\vee\mu_2\vee\ldots\vee\mu_n$ where $n\geq 1$ and for all $i\leq n$, $\mu_i\in\kappa$.

Let $\kappa$ be an AKB, and for all $i\leq n$, $\mu_i\in\kappa$.
1. Let $\omega=\mu_1\wedge\mu_2\wedge\ldots\wedge\mu_n$ be a conjunction over $\kappa$. $\omega$ is F-minimal over $\kappa$ if and only if $\omega=F$ and if any of the $\mu_i$'s is removed from $\omega$, then $\alpha\neq F$.
2. Let $\omega=\mu_1\vee\mu_2\vee\ldots\vee\mu_n$ be a disjunction over $\kappa$. $\omega$ is T-minimal over $\kappa$ if and only if $\omega=T$ and if any of the $\mu_i$'s is removed from $\omega$, then $\omega\neq T$.

Let $\kappa$ be an AKB. $\gamma_\kappa$ is the collection of all F-minimal conjunctions over $\kappa$ and $\underline{\gamma}_\kappa$ is the collection of all T-minimal disjunctions over $\kappa$.

In the rest of the Section, we shall let $\pi=\kappa\cup\lambda$ where $\kappa$ is an AKB and $\lambda$ is a collection of conjectures over $\kappa$.

Let $\mu\in\gamma_\lambda$. Then
1. $p_\pi(\mu)=\vee_{\omega\in\gamma_\pi,\omega_\lambda=\mu}\omega_\kappa\cdot p_\pi(\mu)$ will be referred to as the potential of $\mu$ over $\pi$
2. $\mu$ is consequential over $\kappa$ if and only if $l(p_\pi(\mu))\supseteq\sigma_\kappa(F)$. Otherwise, $\mu$ is inconsequential over $\kappa$.
3. Let $\mu_0\in\lambda$. $\mu_0$ is consequential over $\kappa$ if and only if $\mu_0$ occurred in some $\mu_1\in\gamma_\lambda$ where $\mu_1$ is consequential over $\kappa$. Otherwise, $\mu_0$ is inconsequential over $\kappa$.

Let $L\in\mathcal{L}$, $\kappa_L=\kappa\cup\{(U\to L')\}$, $\pi_L=\kappa_L\cup\lambda$, and $\mu\in\gamma_\lambda$.
1. $\mu$ is L-consequential over $\kappa$ if and only if $l(p_{\pi_L}(\mu))\supseteq\sigma_\kappa(L)$. Otherwise, $\mu$ is L-inconsequential over $\kappa$.
2. Let $\mu_0\in\lambda$. $\mu_0$ is L-consequential over $\kappa$ if and only if $\mu_0$ occurred in some $\mu_1\in\gamma_\lambda$ where $\mu_1$ is L-consequential over $\kappa$. Otherwise, $\mu_0$ is L-inconsequential over $\kappa$.

Let $L\in\mathcal{L}$. If the conjecture $\mu$ is L-inconsequential over $\kappa$, then the establishment of the conjecture $\mu$ will not improve the validity of L over $\kappa$. Therefore, for simplicity, $\mu$ will be eliminated from $\lambda$. Moreover, some of the $\mu\in\gamma_\lambda$ may be L-inconsequential, thus, we shall define $\bar{\gamma}_{\pi_L}$ to consist of all $\mu\in\gamma_\lambda$ which are L-consequential over $\kappa$. If $\bar{\gamma}_{\pi_L}=\emptyset$, then none of the conjectures in $\lambda$ will provide the missing links for L.

If m is a k-measure and $\tilde{m}$ an extension of m, then the elements in $\bar{\gamma}_{\pi_L}$ may be sorted in descending order of $\tilde{m}(r(p_{\pi_L}(\mu)))$ where $\mu\in\bar{\gamma}_{\pi_L}$. In this case, it provides a priority list for examining the various conjectures given in $\lambda$ that supports L.

The discussions so far were restricted to using the validity of L. Parallel results can be derived using plausibility of L. In this case, we let $\kappa_L=\kappa\cup\{(U\to L)\}$, and $\pi_L=\kappa_L\cup\lambda$.

In the above discussions, only deductive reasoning were used. However, the missing links can also be found using inductive inference by applying the results given above to $\pi$.

Some example benefits according to the described embodiments include:

A new and innovative process—Augmented Exploration or A-Exploration—for working with Big Data by utilizing Big Data's own power and exploiting its various unique properties. A-Exploration has the capabilities to continuously uncover, track, understand, analyze, manage, and/or utilize any desired information and knowledge, as well as, oversee, regulate and/or supervise the development, progression and/or evolvement of these information and knowledge.

The embodiments permit organizations and policy makers to employ A-Exploration to address, in real-time, and mitigate considerable challenges to capture the full benefit and potential of Big Data and Beyond. It is comprised of many sequential and parallel phases and/or sub-systems required to control and handle its various operations.

The embodiments automate the overseeing and providing possible roadmap for management, utilization and projection of the outcomes and results obtained via A-Exploration.

The embodiments provide real-time capabilities for handling health care, public sector administration, retail, manufacturing, personal location data, unfolding stories, knowledge/information sharing and discovery, personal assistance, as well as, any fields that deals with information and/or knowledge which covers virtually all areas in this Big Data era.

The embodiments enable and empower A-Exploration through the extensions, expansions, integrations and supplementations to create and establish diverse methods and functionalities to simplify and solve virtually all problems associated with Big Data, Information and Knowledge, including but not limited to:

Continuously Uncover and Track the Desired Information and Knowledge.
 1. Analysis and Deep Understanding of the Information/Knowledge.
 2. Manage and Supervise the Evolution of the Information/Knowledge.
 3. Enable and Generate Projection/Forecasting and Abduction.
 4. Detect and Anticipate Emergent Events and Behaviors.
 5. Locate and Unearth the Missing Links between the Current Situations and the Eventual Desired Solutions.

The embodiments provide a new unification process for use with Augmented Knowledge Base AKB which incorporates Anytime-Anywhere methodologies, and allows heuristics to be employed to speed-up the process and improve the results. This new process can also be extended to include tags to identify the sources of the results.

The embodiments provide a method for purifying an object $\omega$ in the knowledge base by removing all target inconsistencies (as determined by application criteria) contained in $r(\omega)$, comprising of transforming the object into disjunctive normal form and then removing all conjunctions in $r(\omega)$ which are equivalent to FALSE. This will be referred to as purified object.

The embodiments provide constructing purified validity and purified plausibility by using purified objects from the knowledge base.

The embodiments provide a new unification method for any AKBs, consistent or otherwise, where inconsistencies are approximately completely ignored in the unification process; and inconsistencies are handled directly without having to determine them in advanced or removing them first.

The embodiment provide the purified validity and purified plausibility of L, which may be determined by repeated applications of the decomposition rules including:
 1. the purified validity of the disjunction $L_1 \vee L_2$ is the union of the individual purified validity;
 2. the purified validity of the conjunction $L_1 \vee L_2$ is the intersection of the individual purified validity;
 3. the purified plausibility of the disjunction $L_1 \vee L_2$ is the union of the individual purified plausibility, and
 4. the purified plausibility of the conjunction $L_1 \vee L_2$ is the intersection of the purified individual plausibility.

The embodiments analyses and deep understanding of many aspects of the information/knowledge comprising, among other things, of finding the best explanations for the various scenarios and possible courses/paths of how the information/knowledge evolved and/or progressed using deductive and/or inductive reasoning.

According to the embodiments, A-Exploration includes the following functionalities:
 1. Identify the Organization and Chronology of the Information and Knowledge.
 2. Comprehend and Understand the Various Occurrences and Happenings.
 3. Resolve and Establish the Reasons and Explanations for the Origins and Causes of the Various Incidences and Manifestations.
 4. Determine the Causal Effects and Relationships of the Information and Knowledge.
 5. Cognizant and Knowledge of Areas Related or Linked to the Information and Knowledge.
 6. Appreciation and Conscious of the Likely Influences from External Subjects or Areas.
 7. Awareness and Recognition of the Ramifications.
 8. Verification and Anticipation of the Possible Spread and Impact to Other Areas.
 9. Realization and Management of the Plausible Consequences.

The embodiments may be utilized to manage and supervise the evolvement of the many aspects of the information/knowledge, comprising deductive and/or inductive prediction, projection and/or forecasting. And to Project, Predict and Forecast the Effects and Consequences of the Various Actions and Activities. And to Instigate Measures to Supervise and Regulate the Information and Knowledge. And to Initiate Credible Actions to Mitigate and/or Redirect the Plausible Effects and Outcomes of the Information and Knowledge.

The embodiments provide the capabilities of exploring for the desired/ideal alternative outcomes. It may consist, among other things, of augmenting the knowledge bases with temporary, non-permanent and/or transitory knowledge fragments to the CBKBs or AKBs, e.g., Hypotheses Plug-Ins.

The embodiment can be implemented by having multiple A-Exploration systems, each having its own objectives. These A-Exploration systems can be used to build larger systems in hierarchical and/or other fashions, depending on their needs; allowing these systems to cross-pollinate to enhance their overall effects; and the various subsystems of different A-Exploration systems may be combined to optimize their functions.

The embodiments provide creating the building blocks needed to perform projection/forecasting of possible outcomes for any given hypothesis/situation, comprising of setting up the deductive consequent and inductive consequent.

The embodiment provide for projecting/forecasting the possible outcomes of a given hypothesis or situation, using deductive validity measures, in terms of Augmented Knowledge Bases or other similarly structured constructs, comprising: methods for determining projection/forecasting with respect to any atomic proposition; and methods for combining and merging the projection/forecasting of atomic propositions to construct the possible outcomes of projection/forecasting for a given proposition.

According the embodiments, the projection/forecasting uses deductive plausibility measures, inductive validity measures and/or inductive plausibility measures.

According to the embodiments, the possible projections/forecasting are ranked.

The embodiments provide for creating the building blocks needed to perform abduction or determine best explanations of a given observation or situation, comprising of setting up the deductive antecedent and inductive antecedent.

The embodiments provide for using abduction to determine the best explanations of a given observation or situation, using deductive validity measures, in terms of Augmented Knowledge Bases or other similarly structured constructs, comprising: ways for determining abduction with respect to any atomic proposition; and methods for combining and merging the abduction of atomic propositions to construct the possible explanation of given observations/propositions.

According to the embodiments, the abduction uses deductive plausibility measures, inductive validity measures and/or inductive plausibility measures.

According to the embodiments, the possible abductions are ranked.

According to the embodiments, the inverses of κ and are used to perform inductive reasoning.

The embodiments provide for speeding-up the projections/forecasting and/or abductions by storing the results of each atomic propositions for faster retrieval.

The embodiments provide for extending and expanding the projections/forecasting and/or abductions to higher-order projections/forecasting and abductions.

The embodiments determine and handle emergent events/behaviors of complex systems, including collections of AKBs.

The embodiments promote scientific and other discoveries comprising of locating and unearthing the missing links between the current situations and the eventual desired solutions.

The embodiments simplify and accelerate the search for the missing links in scientific and other discoveries comprising: introduction and formulation of conjectures which may consist of information and/or knowledge derived from experiences, educated guesses, findings from similar or related problems, preliminary experimental outcomes, etc.; expression of these conjectures in terms identifiable by the selected knowledge base to permit them to be part of the reasoning process in the knowledge base; establishes the conjectured knowledge base consisting of the given knowledge base and the conjectures; employs the reasoning mechanism of the resulting knowledge base to determine which conjectures is consequential and ranked the consequential conjectures to prioritize the conjecture(s) to be examined first; and eliminates the inconsequential conjectures to improve the search of the missing links.

An apparatus, comprising a computer readable storage medium configured to support managing required data objects and hardware processor to executes the necessary methods and procedures.

According to an aspect of the embodiments of the invention, any combinations of one or more of the described features, functions, operations, and/or benefits can be provided. The word (prefix or suffix article) "a" refers to one or more unless specifically indicated or determined to refer to a single item. The word (prefix or suffix article) "each" refers to one or more unless specifically indicated or determined to refer to all items. A combination can be any one of or a plurality. The expression "at least one of" a list of item(s) refers to one or any combination of the listed item(s). The expression "all" refers to an approximate, about, substantial amount or quantity up to and including "all" amounts or quantities.

A computing apparatus, such as (in a non-limiting example) any computer or computer processor, that includes processing hardware and/or software implemented on the processing hardware to transmit and receive (communicate (network) with other computing apparatuses), store and retrieve from computer readable storage media, process and/or output data. According to an aspect of an embodiment, the described features, functions, operations, and/or benefits can be implemented by and/or use processing hardware and/or software executed by processing hardware. For example, a computing apparatus as illustrated in FIG. 8 can comprise a central processing unit (CPU) or computing processing system 804 (e.g., one or more processing devices (e.g., chipset(s), including memory, etc.) that processes or executes instructions, namely software/program, stored in the memory 806 and/or computer readable storage media 812, communication media interface (network interface) 810 (e.g., wire/wireless data network interface to transmit and received data), input device 814, and/or an output device 802, for example, a display device, a printing device, and which are coupled (directly or indirectly) to each other, for example, can be in communication among each other through one or more data communication buses 808.

In addition, an apparatus can include one or more apparatuses in computer network communication with each other or other apparatuses and the embodiments relate to augmented exploration for big data involving one or more apparatuses, for example, data or information involving local area network (LAN) and/or Intranet based computing, cloud computing in case of Internet based computing, Internet of Things (IoT) (network of physical objects computer readable storage media (e.g., databases, knowledge bases), devices (e.g., appliances, cameras, mobile phones), vehicles, buildings, and other items, embedded with electronics, software, sensors that generate, collect, search (query), process, and/or analyze data, with network connectivity to exchange the data), online websites. In addition, a computer processor can refer to one or more computer processors in one or more apparatuses or any combinations of one or more computer processors and/or apparatuses. An aspect of an embodiment relates to causing and/or configuring one or more apparatuses and/or computer processors to execute the described operations. The results produced can be output to an output device, for example, displayed on the display or by way of audio/sound. An apparatus or device refers to a physical machine that performs operations by way of electronics, mechanical processes, for example, electromechanical devices, sensors, a computer (physical computing hardware or machinery) that implement or execute instructions, for example, execute instructions by way of software, which is code executed by computing hardware including a programmable chip (chipset, computer processor, electronic component), and/or implement instructions by way of computing hardware (e.g., in circuitry, electronic components in integrated circuits, etc.) collectively referred to as hardware processor(s), to achieve the functions or operations being described. The functions of embodiments described can be implemented in a type of apparatus that can execute instructions or code.

More particularly, programming or configuring or causing an apparatus or device, for example, a computer, to execute the described functions of embodiments of the invention creates a new machine where in case of a computer a general purpose computer in effect becomes a special purpose computer once it is programmed or configured or caused to perform particular functions of the embodiments of the invention pursuant to instructions from program software. According to an aspect of an embodiment, configuring an apparatus, device, computer processor, refers to such apparatus, device or computer processor programmed or controlled by software to execute the described functions.

A program/software implementing the embodiments may be recorded on a computer-readable storage media, e.g., a non-transitory or persistent computer-readable storage media. Examples of the non-transitory computer-readable media include a magnetic recording apparatus, an optical disk, a magneto-optical disk, and/or volatile and/or non-volatile semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), DVD-ROM, DVD-RAM (DVD-Random Access Memory), BD (Blue-ray Disk), a CD-ROM (Compact Disc-Read Only Memory), and a CD-R (Recordable)/RW. The program/software implementing the embodiments may be transmitted over a transmission communication path, e.g., a wire and/or a wireless network implemented via hardware. An example of communication media via which the program/software may be sent includes, for example, a carrier-wave signal.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A non-transitory computer-readable storage medium storing a program which when executed in a system including a processor coupled to a memory, perform a process to augment at least one digitized data of a plurality of digitized data input from a plurality of computerized data sources $d_1, d_2, \ldots, d_l$ forming a first set of evidences U to represent a first knowledge base (KB) among a plurality of KBs, by:

obtaining a subset of concept graphs of nodes $ca_{i_1}, ca_{i_2}, \ldots, ca_{i_h}$ from concept graphs $ca_1, ca_2, \ldots, ca_n$ according to a computable measure of consistency, inconsistency, and/or priority threshold between each $ca_j$ in $ca_1, ca_2, \ldots, ca_n$ to each specification concept graph $spec_k$ in $spec_1, spec_2, \ldots, spec_m$ of concept nodes of concepts and relation nodes according to the at least one digitized data, the concept graphs of nodes $ca_1, ca_2, \ldots, ca_n$ including concept nodes and relation nodes for corresponding obtained plurality of information and knowledge (IKs) $a_1, a_2, \ldots, a_n$ forming a second set of evidences U to represent a second (KB) among the plurality of KBs;

generating knowledge fragment objects in form of concept fragments obtained for corresponding subset of concept graphs $ca_{i_1}, ca_{i_2}, \ldots, ca_{i_h}$, a knowledge fragment object among the knowledge fragment objects storing a mapping of values to first and second sets of evidences U, where a rule A is a rule among rules A' in at least the first KB and the second KB among the plurality of KBs, and a subset of evidence E is a subset of the first and second sets of evidences U from the at least first KB and the second KB, so that the rule A is supportable by the subset of evidences E, according to the concept fragments; and generating augmenting information objects by, creating objects in form $\omega = E \to A$ from the concept fragments;

computing for each object $\omega$ a validity (v) and a plausibility (p) based upon atomic propositions among the rules A';

obtaining relationship constraints $\mathcal{C}_K$ in form of a plurality of set relations among a plurality of subsets of evidences E for a plurality of the concept fragments;

obtaining propositions $\mathcal{A}_K$ for the plurality of the concept fragments in form of logical relations from among the rules A' in the at least first KB and the second KB and/or from the atomic propositions;

computing a validity (v) and a plausibility (p), for respective combinations of the relationship constraints $\mathcal{C}_K$ and the propositions $\mathcal{A}_K$; and generating information tags to identify each object $\omega$, each relationship constraint in $\mathcal{C}_K$, and each proposition in and corresponding validity (v) and/or plausibility (p) from the computed validity (v) and plausibility (p), to cause extending, by the augmenting information objects, at least information indicating a forecasting and/or an abduction based upon the concepts, to a higher-order projection and/or abduction, deductively and/or inductively, in conjunction with the generated information tags.

2. The non-transitory computer-readable storage medium according to claim 1, further comprising:
generating and ranking new objects in the form $\omega = E \to A$ based on validity and plausability using a computerized process of forecasting according to the $spec_1, spec_2, \ldots, spec_m$ concept nodes.

3. The non-transitory computer-readable storage medium according to claim 1, further comprising:
generating and ranking a plurality of the objects in the form $\omega = E \to A$ based on validity and plausibility that support at least one object in the form $\omega = E \to A$ from the plurality of objects in the in the form $\omega = E \to A$ corresponding to the $spec_1, spec_2, \ldots, spec_m$ concept nodes, using a computerized process of abduction.

4. The non-transitory computer-readable storage medium according to claim 1, further comprising:
executing based upon the $spec_1, spec_2, \ldots, spec_m$ concept nodes any one or combination of processes of:
computing, using deductive and/or inductive reasoning, a plurality of sequences of a plurality of the objects in the form $\omega = E \to A$ to be indicative of evolving and/or progress of the plurality of the objects in the form ω=E→A corresponding to a plurality of IKs $a_1$, $a_2, \ldots, a_n$;

computing a plurality of alternative outcomes on a plurality of the objects in the form ω=E→A using deductive projection forecasting and/or inductive projection forecasting;

computing emergence on a plurality of the objects in the form ω=E→A;

computing a plurality of new objects in the form ω=E→A that serve as unknown/missing links in deductive and/or inductive reasoning for determining validity and plausibility; and generating results of the one or combination of processes executed.

5. The non-transitory computer-readable storage medium according to claim 1, wherein a generating the specification concept in the $spec_1$, $spec_2, \ldots,$ $spec_m$ concept nodes includes computing, for the first KB, a plurality of new objects in the form of ω=E→A from the plurality of digitized data to serve as an alignment between digitized data in the plurality of digitized data.

6. The non-transitory computer-readable storage medium according to claim 1, wherein the $spec_1$, $spec_2, \ldots,$ $spec_m$ concept nodes is information generated in response to a query of a computerized data source d among the computerized data sources $d_1, d_2, \ldots, d_l$ or a domain specification.

7. The non-transitory computer-readable storage medium according to claim 1, wherein the KBs include Bayesian Knowledge Bases (BKBs), Compound BKBs (CBKBs), Relational Databases (RDbs), Deductive Databases (DDbs), Augmented Knowledge-Bases (AKBs).

8. The non-transitory computer-readable storage medium according to claim 1, wherein the concepts are according to user input to control generation of the specification concept graph $spec_k$.

9. The non-transitory computer-readable storage medium according to claim 1, wherein the information tags include one or a combination of information to indicate an audit of generation of the knowledge fragment objects, or provide an explanation of the computing of the validity (v) and plausibility (p) for the respective combinations of the relationship constraints $C_K$ and the proposition $\mathcal{A}_K$.

10. An apparatus, comprising:
a memory; and
a processor coupled to the memory and to,
obtain a subset of concept graphs of nodes $ca_{i_1}$, $ca_{i_2}, \ldots, ca_{i_h}$ from concept graphs $ca_1, ca_2, \ldots, ca_n$ according to a computable measure of consistency, inconsistency, and/or priority threshold between each $ca_j$ in $ca_1, ca_2, \ldots, ca_n$ to each specification concept graph $spec_k$ in $spec_1, spec_2, \ldots, spec_m$ of concept nodes of concepts and relation nodes according to at least one digitized data of a plurality of digitized data input from a plurality of computerized data sources $d_1, d_2, \ldots, d_l$ forming a first set of evidences U to represent a first KB among a plurality of KBs, the concept graphs of nodes $ca_1, ca_2, \ldots, ca_n$ including concept nodes and relation nodes for corresponding obtained plurality of information and knowledge (IKs) $a_1, a_2, \ldots, a_n$ forming a second set of evidences U to represent a second KB among the plurality of KBs;

generate knowledge fragment objects in form of concept fragments obtained for corresponding subset of concept graphs $ca_{i_1}$, $ca_{i_2}$, $ca_{i_h}$, a knowledge fragment object among the knowledge fragment objects storing a mapping of values to first and second sets of evidences U, where a rule A is a rule among rules A' in at least the first KB and the second KB among the plurality of KBs, and a subset of evidences E is a subset of the first and second sets of evidences U from the at least first KB and the second KB, so that the rule A is supportable by the subset of evidences E, according to the concept fragments; and generate augmenting information objects by,
creating objects in form ω=E→A from the concept fragments;

computing for each object ω a validity (v) and a plausibility (p) based upon atomic propositions among the rules A';

obtaining relationship constraints $C_K$ in form of a plurality of set relations among a plurality of subsets of evidences E for a plurality of the concept fragments;

obtaining propositions $\mathcal{A}_K$ for the plurality of the concept fragments in form of logical relations from among the rules A' in the at least first KB and the second KB and/or from the atomic propositions;

computing a validity (v) and a plausibility (p), for respective combinations of the relationship constraints $C_K$ and the propositions $\mathcal{A}_K$; and generating information tags to identify the object ω, the relationship constraints in $C_K$, the proposition in $\mathcal{A}_K$, and corresponding validity (v) and/or plausibility (p) from the computed validity (v) and plausibility (p), to cause extending, by the augmenting information objects, at least information indicating a forecasting and/or an abduction based upon the concepts, to a higher-order projection and/or abduction, deductively and/or inductively, in conjunction with the generated information tags.

11. The apparatus according to claim 10, wherein the processor is to:
generate and rank new objects in the form ω=E→A based on validity and plausability using a computerized process of forecasting according to the $spec_1, spec_2, \ldots, spec_m$ concept nodes.

12. The apparatus according to claim 10, wherein the processor is to:
generate and rank a plurality of the objects in the form ω=E→A based on validity and plausibility that support at least one object in the form ω=E→A from the plurality of objects in the form 107 =E→A corresponding to the $spec_1, spec_2, \ldots, spec_m$ concept nodes, using a computerized process of abduction.

13. The apparatus according to claim 10, wherein the processor is to,
execute based upon the $spec_1, spec_2, \ldots, spec_m$ concept nodes any one or combination of processes of,
computing, using deductive and/or inductive reasoning, a plurality of sequences of a plurality of the objects in the form ω=E→A to be indicative of evolving and/or progress of the plurality of the objects in the form ω=E→A corresponding to a plurality of IKs $a_1, a_2, \ldots, a_n$;

computing a plurality of alternative outcomes on a plurality of the objects in the form ω=E→A using deductive projection forecasting and/or inductive projection forecasting;

computing emergence on a plurality of the objects in the form ω=E→A;

computing a plurality of new objects in the form ω=E→A that serve as unknown/missing links in deductive and/or inductive reasoning for determining validity and plausibility; and generate results of the one or combination of processes executed.

14. The apparatus according to claim 10, wherein a generating the specification concept graph $spec_k$ in the $spec_1$, $spec_2$, ..., $spec_m$ concept nodes includes computing, for the first KB, a plurality of new objects in the form of ω=E→A from the plurality of digitized data to serve as an alignment between the plurality of digitized data.

15. The apparatus according to claim 10, wherein the $spec_1$, $spec_2$, ..., $spec_m$ is information generated in response to a query of a computerized data source d among the computerized data sources $d_1$, $d_2$, ..., $d_l$ or a domain specification.

16. The apparatus according to claim 10, wherein the KBs include Bayesian Knowledge Bases (BKBs), Compound BKBs (CBKBs), Relational Databases (RDbs), Deductive Databases (DDbs), Augmented Knowledge-Bases (AKBs).

17. The apparatus according to claim 10, wherein the at least one processor is to receive the concepts according to user input to control generation of the specification concept graph $spec_k$.

18. The apparatus according to claim 10, wherein the information tags include one or a combination of information to indicate an audit of generation of the knowledge fragment objects, or provide an explanation of the computing of the validity (v) and plausibility (p) for the respective combinations of the relationship constraints $\mathcal{C}_K$ and the propositions $\mathcal{A}_K$.

19. A non-transitory computer-readable storage medium storing a program which when executed in a system including a processor coupled to a memory, perform a process to:

obtain a subset of concept graphs of nodes $ca_{i_1}$, $ca_{i_2}$, ..., $ca_{i_k}$ from $ca_1$, $ca_2$, ..., $ca_n$ according to a computable measure of consistency, inconsistency and/or priority threshold between $ca_j$ in $ca_1$, $ca_2$, ..., $ca_n$ to specification concept graph $spec_k$ in $spec_1$, $spec_2$, ..., $spec_m$ of concept nodes of concepts and relation nodes according to at least one digitized data of a plurality of digitized data input from a plurality of computerized data sources $d_1$, $d_2$, ..., $d_l$ forming a first set of evidences U to represent a first knowledge base (KB) among a plurality of KBs, the concept graphs of nodes $ca_1$, $ca_2$, ..., $ca_n$ including concept nodes and relation nodes for corresponding obtained plurality of information and knowledge (IKs) $a_1$, $a_2$, ..., $a_n$ forming a second set of evidences U to represent a second KB among the plurality of KBs; and generate concept fragments obtained for corresponding subset of concept graphs $ca_{i_1}$, $ca_{i_2}$, ..., $ca_{i_k}$, to include augmenting information objects by creating or adding into at least one KB among the KBs, new objects in form ω=E→A from the concept fragments, where a subset of evidences E is a subset of the first and second sets of evidences U from the at least first KB and the second KB that supports a rule A, so that the rule A is supportable by the subset of evidences E, according to the concept fragments, and to include a computed validity (v) and a plausibility (p) for a combination of relationship constraints $\mathcal{C}_K$ for the concept fragments and obtained propositions $\mathcal{A}_K$ for the concept fragments.

* * * * *

UNITED STATES PATENT AND TRADEMARK OFFICE
CERTIFICATE OF CORRECTION

PATENT NO. : 11,782,929 B2
APPLICATION NO. : 17/561022
DATED : October 10, 2023
INVENTOR(S) : Eugene S. Santos et al.

Page 1 of 3

It is certified that error appears in the above-identified patent and that said Letters Patent is hereby corrected as shown below:

In the Claims

Column 33, Lines 60-61:
In Claim 1, delete "$ca_{i1}, ca_{i2}, \ldots, ca_{ih}$" and insert -- $c\alpha_{i1}, c\alpha_{i2}, \ldots, c\alpha_{ih}$ --.

Column 33, Line 61:
In Claim 1, delete "$ca_1, ca_2, \ldots, ca_n$" and insert -- - $c\alpha_1, c\alpha_2, \ldots, c\alpha_n$ --.

Column 33, Line 64:
In Claim 1, delete "$ca_j$ in $ca_1, ca_2, \ldots, ca_n$" and insert -- $c\alpha_j$ in $c\alpha_1, c\alpha_2, \ldots, c\alpha_n$ --.

Column 34, Line 1:
In Claim 1, delete "$ca_1, ca_2, \ldots, ca_n$" and insert -- $c\alpha_1, c\alpha_2, \ldots, c\alpha_n$ --.

Column 34, Line 4:
In Claim 1, delete "$a_1, a_2, \ldots, a_n$" and insert -- $\alpha_1, \alpha_2, \ldots, \alpha_n$ --.

Column 34, Line 8:
In Claim 1, delete "$cai_1, cai_2, \ldots, cai_h$," and insert -- $c\alpha_{i1}, c\alpha_{i2}, \ldots, c\alpha_{ih}$, --.

Column 34, Line 15:
In Claim 1, delete "evidence" and insert -- evidences. --.

Column 34, Line 38:
In Claim 1, after "in" insert -- $A_k$ --.

Column 34, Line 50:
In Claim 2, delete "plausibility" and insert -- plausibility. --.

Signed and Sealed this
Third Day of September, 2024

Katherine Kelly Vidal
*Director of the United States Patent and Trademark Office*

CERTIFICATE OF CORRECTION (continued)
U.S. Pat. No. 11,782,929 B2

Column 34, Line 58:
In Claim 3, delete "in the in the" and insert -- in the --.

Column 35, Lines 2-3:
In Claim 4, delete "$a_1, a_2, \ldots, a_n;$" and insert -- $\alpha_1, \alpha_2, \ldots, \alpha_n;$ --.

Column 35, Line 18:
In Claim 5, after "concept" insert -- graph *$spec_k$* --.

Column 35, Lines 41-42:
In Claim 9, delete "pluasibility" and insert -- plausibility --.

Column 35, Lines 47-48:
In Claim 10, delete "$ca_{i1}, ca_{i2}, \ldots, ca_{ih}$" and insert -- $c\alpha_{i1}, c\alpha_{i2}, \ldots, c\alpha_{ih}$ --.

Column 35, Line 48:
In Claim 10, delete "$ca_1, ca_2, \ldots, ca_n$" and insert -- $c\alpha_1, c\alpha_2, \ldots, c\alpha_n$ --.

Column 35, Line 51:
In Claim 10, delete "$ca_j$ in $ca_1, ca_2, \ldots, ca_n$" and insert -- $c\alpha_j$ in $c\alpha_1, c\alpha_2, \ldots, c\alpha_n$ --.

Column 35, Line 57:
In Claim 10, delete "first KB" and insert -- first knowledge base (KB) --.

Column 35, Line 59:
In Claim 10, delete "$ca_1, ca_2, \ldots, ca_n$" and insert -- $c\alpha_1, c\alpha_2, \ldots, c\alpha_n$ --.

Column 35, Line 62:
In Claim 10, delete "$a_1, a_2, \ldots, a_n$" and insert -- $\alpha_1, \alpha_2, \ldots, \alpha_n$ --.

Column 35, Line 67:
In Claim 10, delete "$ca_{i1}, ca_{i2}, \ldots, ca_{ih},$" and insert -- $c\alpha_{i1}, c\alpha_{i2}, \ldots, c\alpha_{ih}$ --.

Column 36, Line 43:
In Claim 11, delete "plausability" and insert -- plausibility --.

Column 36, Line 51:
In Claim 12, delete "107" and insert -- $\omega$ --.

Column 36, Lines 62-63:
In Claim 13, delete "$a_1, a_2, \ldots, a_n;$" and insert -- $\alpha_1, \alpha_2, \ldots, \alpha_n;$ --.

Column 38, Lines 4-5:
In Claim 19, delete "$ca_{i1}, ca_{i2}, \ldots, ca_n$" and insert -- $c\alpha_{i1}, c\alpha_{i2}, \ldots, c\alpha_{ih}$ --.

CERTIFICATE OF CORRECTION (continued)
U.S. Pat. No. 11,782,929 B2

Column 38, Line 5:
In Claim 19, delete "$ca_1, ca_2, \ldots, ca_n$" and insert -- $c\alpha_1, c\alpha_2, \ldots, c\alpha_n$ --.

Column 38, Line 7:
In Claim 19, delete "$ca_j$ in $ca_1, ca_2, \ldots, ca_n$" and insert -- $c\alpha_j$ in $c\alpha_1, c\alpha_2, \ldots, c\alpha_n$ --.

Column 38, Line 15:
In Claim 19, delete "$ca_1, ca_2, \ldots, ca_n$" and insert -- $c\alpha_1, c\alpha_2, \ldots, c\alpha_n$ --.

Column 38, Line 18:
In Claim 19, delete "$a_1, a_2, \ldots, a_n$" and insert -- $\alpha_1, \alpha_2, \ldots, \alpha_n$ --.

Column 38, Line 21:
In Claim 19, delete "$ca_{i1}, ca_{i2}, \ldots, ca_{ih},$" and insert -- $c\alpha_{i1}, c\alpha_{i2}, \ldots, c\alpha_{ih},$ --.